United States Patent [19]
Malkin et al.

[11] Patent Number: 6,085,193
[45] Date of Patent: *Jul. 4, 2000

[54] METHOD AND SYSTEM FOR DYNAMICALLY PREFETCHING INFORMATION VIA A SERVER HIERARCHY

[75] Inventors: Peter Kenneth Malkin, Ardsley; Philip Shi-lung Yu, Chappaqua, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/939,277

[22] Filed: Sep. 29, 1997

[51] Int. Cl.⁷ .................................................. G06F 17/30
[52] U.S. Cl. .................... 707/10; 707/3; 707/104; 707/200; 395/200.3; 364/281.5; 364/282.1; 364/282.4
[58] Field of Search .................. 707/3, 10, 200, 707/104, 202, 204; 395/200.3; 364/281.5, 282.1, 282.4, 200.3, 2

[56] References Cited

U.S. PATENT DOCUMENTS

| | | | |
|---|---|---|---|
| 5,228,859 | 7/1993 | Rowe | 434/118 |
| 5,596,748 | 1/1997 | Kleewein et al. | 707/10 |
| 5,603,025 | 2/1997 | Tabb et al. | 707/2 |
| 5,640,555 | 6/1997 | Kleewein et al. | 707/10 |
| 5,652,858 | 7/1997 | Okada et al. | 711/137 |
| 5,706,507 | 1/1998 | Schloss | 707/104 |
| 5,742,762 | 4/1998 | Scholl et al. | 395/200.3 |
| 5,748,897 | 5/1998 | Katiyar | 395/200.49 |
| 5,754,938 | 5/1998 | Herz et al. | 345/327 |
| 5,754,939 | 5/1998 | Herz et al. | 345/327 |
| 5,781,909 | 7/1998 | Logan et al. | 707/200 |
| 5,799,309 | 8/1998 | Srinivasan | 707/102 |
| 5,805,809 | 9/1998 | Singh et al. | 395/200.33 |
| 5,812,996 | 9/1998 | Rubin et al. | 707/2 |
| 5,818,448 | 10/1998 | Katiyar | 345/335 |
| 5,822,749 | 10/1998 | Agarwal | 707/2 |
| 5,828,851 | 10/1998 | Nixon et al. | 395/285 |
| 5,835,087 | 11/1998 | Herz et al. | 345/327 |
| 5,835,718 | 11/1998 | Blewett | 395/200.48 |
| 5,848,413 | 12/1998 | Wolff | 707/10 |
| 5,862,325 | 1/1999 | Reed et al. | 395/200.31 |
| 5,926,179 | 7/1999 | Matsuda et al. | |

OTHER PUBLICATIONS

Kun–Lung Wu et al., "SpeedTracer: A Web Usage Mining and Analysis Tool", IBM Systems Journal, vol. 37, No. 1, pp. 89–105, 1998.

Primary Examiner—Thomas G. Black
Assistant Examiner—Jean M. Corrielus
Attorney, Agent, or Firm—Ratner & Prestia

[57] ABSTRACT

A method and system for prefetching data for clients associated with a proxy server hierarchy and an enhanced content server data transfer to the clients. The method for prefetching data identifies data access patterns and prefetches select information based on a dynamic interpretation of the data access patterns. The content server or proxy server identifies data access reference patterns of clients associated with the content server or the proxy server hierarchy. The data access patterns are preferably stored in a statistics table. The content server generates prefetch hint information based on inputs from the statistics table. The prefetch hint information annotates requested information or objects requested by the clients. The prefetch hint information optimally is updated as the requested information passes through the proxy server hierarchy. The prefetch hint information annotates the requested information requested by the clients. The ultimate decision to prefetch select information for the clients is made based on the prefetch hint information and prefetch hint values. The prefetch hint value is calculated based on local node-specific factors, such as storage constraints and access time.

18 Claims, 15 Drawing Sheets

METHOD AND SYSTEM FOR DYNAMICALLY PREFETCHING INFORMATION VIA A SERVER HIERARCHY

FIELD OF THE INVENTION

The present invention is related to a method and apparatus for dynamic prefetching of information or objects for clients, wherein the clients are preferably associated with hierarchy of proxy servers. In particular, aspects of the present invention are related to prefetching Web objects on the World Wide Web.

GLOSSARY OF TERMS

While dictionary meanings are also implied by certain terms used here, the following glossary of some terms may be useful.

Internet: The network of networks and gateways that use the TCP/IP suite of protocols.

Client: A client is a computer which issues commands to the server which performs the task associated with the command.

Server: Any computer that performs a task at the command of another computer is a server. A Web server typically supports one or more clients.

World Wide Web (WWW or Web): The Internet's application that lets users seeking information on the Internet switch connection from server to server and database to database by choosing ("clicking on") highlighted words or phrases of interest (known as hyperlinks). An Internet WWW server supports clients and provides information to the clients. The Web, which can be considered as the Internet with all of the resources addressed as URLs, uses HTML to display the information corresponding to URLs, and provides a point-and-click interface to other URLs.

Universal Resource Locator (URL): The URL is the method to uniquely identify or address information on the Internet, and may be considered a Web document version of an e-mail address. URLs may be cumbersome if they are associated with documents nested deeply within other documents. URLs may be accessed with a Hyperlink. An example of a URL identification is "http://www.philipyu.com:80/table.html". The URL has four components. Starting from the left of the example, the first component specifies the protocol to use (in this case http), separated from the rest of the locator by a ":". The next component is the hostname or IP address of the target host; this component is delimited by the double slash "//" on the left and on the right by a single slash "/" (or optionally a ":"). The port number is an optional component, and is delimited on the left from the hostname by a ":" and on the right by a single slash "/". The fourth component is the actual file name or program name (in this example, table.html). In this example, the ".html" extension means that this is an HTML file.

HyperText Markup Language (HTML): HTML is a language used by Web servers to create and connect documents that are viewed by Web clients. HTML uses Hypertext documents.

Hypertext transfer protocol (HTTP): HTTP is an example of a stateless protocol, in which every request from a client to a server is treated independently. The server has no record of previous connections. At the beginning of a URL, "http:" indicates the requesting client and target server should communicate using the HTTP protocol regarding the specified resource.

Internet Browser or Web browser: A graphical interface tool that runs Internet protocols such as HTTP, and display results on the customers screen. The browser can act as an Internet tour guide, complete with pictorial desktops, directories and search tools used when a user "surfs" the Internet. In this application the Web browser is a client service which communicates with the World Wide Web.

Client cache: Client caches are typically used as a primary group (caches) of objects accessed by the client. In the WWW environment, client caches are typically implemented by web browsers and may cache objects accessed during a current invocation, i.e., a non persistent cache, or may cache objects across invocations.

Caching proxies: Specialized servers in a network which act as agents on the behalf of the client to locate an object, possibly returning a cached copy. Caching proxies typically serve as secondary or higher level caches, because they are invoked as a result of cache misses from client caches.

HTTP Daemon (HTTPD): A server having Hypertext Transfer Protocol and Common Gateway Interface capability. The HTTPD is typically supported by an access agent which provides the hardware connections to machines on the Internet and access to the Internet, such as TCP/IP couplings.

META-tagging: The association of information with a given object. For example, in HTTP, information can be associated with both requests and responses in the fields of the HTTP header. For example, an HTTP server can specify the URL from which a returned page was requested.

BACKGROUND OF THE INVENTION

As the World Wide Web (WWW or Web) increases in popularity, traffic over the Internet has increased considerably. The Web has now become one of the primary bottlenecks on network performance. For example, a Web user may experience noticeable delays when documents or information are requested by the user who is connected to a server via a slow network link. The Web's transferring of the information over the network to the user further increases the level of traffic over the network. The increased traffic reduces the bandwidth available for the requests of other users, contributing to additional potential delays.

To reduce access latencies for clients, the prior art has stored or cached copies of popular documents of information closer to the user at network nodes, from which the access latencies are more acceptable. The caching can be implemented at various points on the network. For example, a large university or corporation may have its own local cache, from which all the users subscribing to that network may fetch documents. A local cache may be implemented in the form of a specialized server.

A specialized server, which is called a caching proxy, may act as an agent on the behalf of clients to locate any potential cached copy of requested information. Caching proxies usually serve as secondary or higher level caches because caching proxies are concerned only with misses left over from failed client caches. Client caches are built into various Web browsers. Client caches may either store only the document accesses during the current invocation (nonpersistent cache such as Mosaic) or may cache documents across invocations.

Previous work on the caching of Web documents has mainly been in the area of on-demand caching. On-demand caching means a caching decision is made after an object is requested. For example, Abrams et. al., "Caching Proxies: Limitations and Potentials", Proc. 4th International World Wide Web Conference, 1996, describes different on-demand caching policies that have been examined for the Web.

In an Internet Service Provider (ISP) network or a corporate network, different regional proxies or departmental proxies in the proxy hierarchy may observe different reference behavior or face different network traffic and delay. The presence of the proxy hierarchy further complicates the prefetch decision on whether all the intermediate proxies, the client, or a subset of them should perform the prefetch. Thus, a need exists for a prefetching method and system that can effectively coordinate prefetching activities with respect to the proxy server hierarchy and associated clients.

SUMMARY OF THE INVENTION

The present invention is directed toward a method and apparatus for prefetching information in a proxy hierarchy to reduce object access time through the network (i.e. Internet) for clients. The method and apparatus prefetches select information from a content server to make the select information readily accessible to clients associated with a content server in a network. The clients are preferably associated with proxy servers in the network. The clients request information from at least one of the proxy servers. The content server generates prefetch hint information for the clients based on past data access patterns of the requested information by the clients. The content server annotates the requested information with prefetch hint information. One or more proxy servers may dynamically update the prefetch hint information based on dynamic usage statistics. The prefetch hint information is updated as the object passes through the proxy hierarchy to reflect prefetch operations performed, caching status at higher levels of the proxy hierarchy, and other local considerations, such as local reference patterns. Select information may be prefetched from the content server or any of the proxy servers based upon the prefetch hint information and the requested information. The prefetch hint information may be assigned a prefetch value based upon reference access probability and storage considerations. The select information with the highest prefetch values in the prefetch hint information list are cached first and potentially until the prefetch cache is filled.

DETAILED DESCRIPTION

Figure 1:
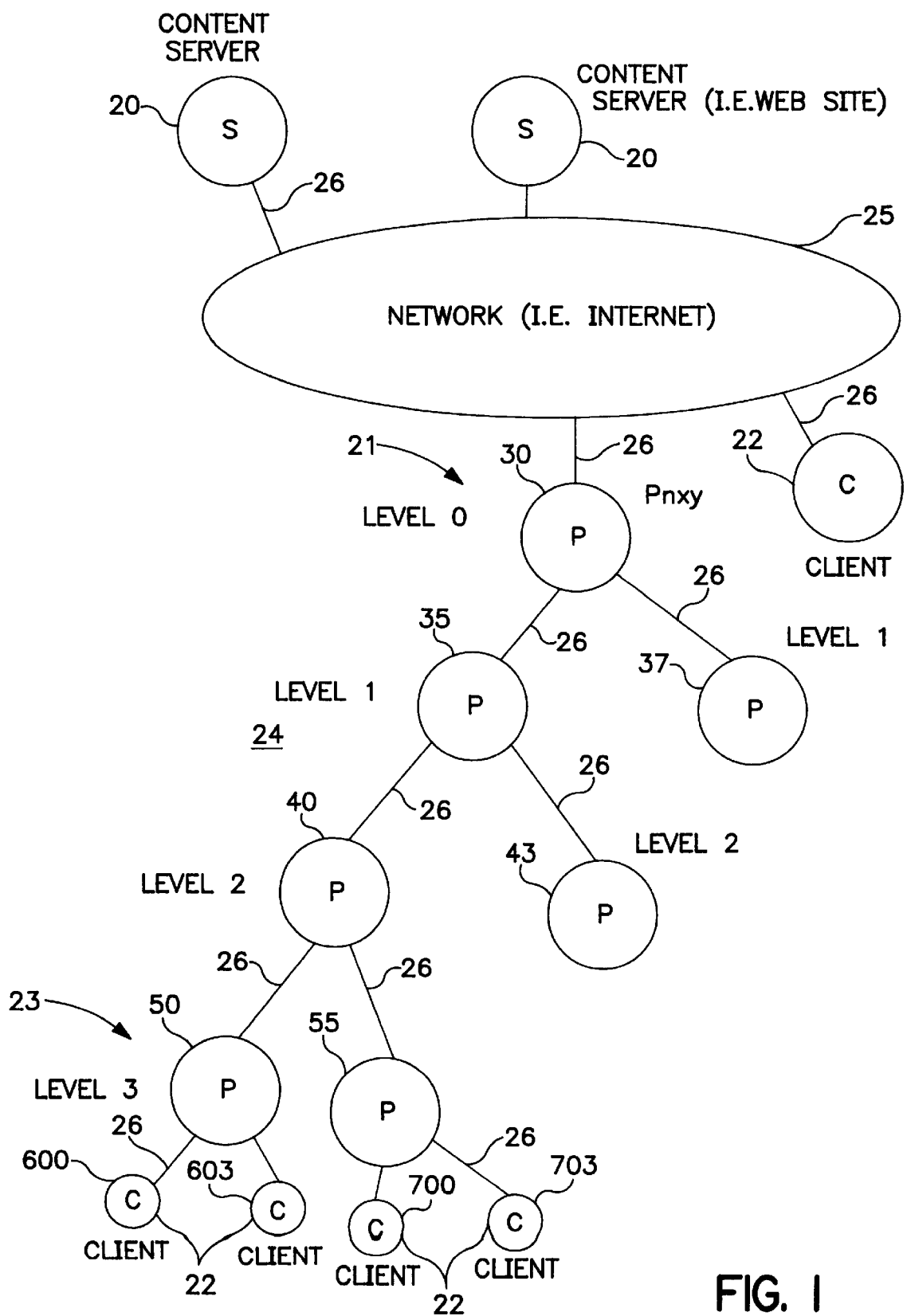
FIG. 1 is a block diagram showing content servers (i.e. Web sites), a network (i.e. Internet), a proxy server hierarchy, and clients in accordance with an exemplary embodiment of the present invention.

FIG. 1 shows a data processing system that includes clients 22, a hierarchy of proxy servers 24, a network 25, and content servers 20.

The clients may request information in the form of parent objects, child objects, requested objects, select objects, pages, requested information and select information. Parent objects are related to child objects such that parent objects may have historically proceeded subsequent requests for one or more associated child objects. Requested objects are analogous to parent objects, while select objects are analogous to child objects. Requested objects are objects which are actually requested by one or more clients. Meanwhile, select objects are objects which are grouped with or related to the requested objects such that the select objects may be proximately, temporally requested after the requested objects. Requested information includes requested objects, parent objects, and other forms of data requested by the clients. Select information includes child objects, select objects, and other forms of data that may be prefetched.

The clients 22 may request information from the content servers 20 or proxy servers 24. However, the proxy servers 24 usually act as intermediaries for the clients 22 with respect to the network 25 and content servers 20. Advantageously, the proxy servers 24 may fulfill the clients' information requests without contacting the content servers 20, if the proxy server hierarchy contains the requested information or has the ability to complete a requested task. The data processing system of FIG. 1 may be applied to the Internet. For example, the content server 20 may comprise a Web site, while the network 25 may comprise the Internet.

FIG. 1 illustrates logical connections 26, as opposed to physical connections, between elements of the data processing system. The logical connections 26 represent the information flow of objects and requests within the data processing system. The logical connections 26 do not typically represent physical connections between the proxy servers 24. The logical connections 26 can change due to workload and/or physical events such as a node or a communications link failure. Different types of objects may follow different logical paths of transmission to reach the clients 22.

While virtually any number of clients 22 and proxy servers 24 may be used in practice, the illustrative example of FIG. 1 features four clients 22 and four hierarchical levels of proxy servers 24. In practice, any number of levels in the proxy server hierarchy are permitted and the clients 22 can be logically connected to any level of the proxy server hierarchy. For example, the hierarchy of proxy servers 24 could be a single proxy server. The present invention may be practiced with merely a single client 22 and a single proxy server 24.

As shown, the highest level proxy server is designated as a level-zero proxy server 30. "Level-zero" is an arbitrary designation which merely defines the status of the one proxy server with respect to another proxy server in the illustrative example of FIG. 1. The highest level proxy server may be logically connected to the network 25. The higher level proxy servers 21 are more closely, logically associated with the network 25 than the lower level server proxies 23.

A first level-one proxy server 35 and a second level-one proxy server 37 are logically coupled to the level-zero proxy server 30. The first level-one proxy server 35 is connected to a first level-two proxy server 40 and a second level-two proxy server 43. The first level two proxy server 40 is logically coupled to a first level-three proxy server 50 and a second level-three proxy server 55.

The clients 22 include a first client 600, a second client 603, a third client 700, and a fourth client 703. The first client 600 and the second client 603 are logically coupled to a first level-three proxy server 50. The third client 700 and the fourth client 703 are logically coupled to the second level-three proxy server 55.

The data processing system is now described from the viewpoint of the second client 603. The second client 603 is coupled to its immediately higher level proxy. As illustrated, the immediately higher level proxy is the first level-three proxy 50. The second client 603 is then coupled to the first level-two proxy server 40, the first level-one proxy server 35, and the level-zero proxy server 30, respectively. The second client 603 can access various content servers 20 through the network 25. Although a typical communication path for the second client 603 is via the immediately higher level proxy(i.e. the first level-three proxy server 50), the second client 603 or a lower level proxy may communicate directly to other higher level proxy servers 24 or the network 25. The second client 603 may even have its own client proxy to manage caching.

From the view point of second client 603, certain proxy servers are not part of its proxy hierarchy. For example, the second level-three proxy server 55 and the second level-two proxy server 43, and the second level-one proxy server 37 are not part of the second client's proxy server hierarchy.

Clients 22 may include, but are not limited to, personal computers, workstations, set top boxes, or the like. The network 25 may include, but does not need to include, the Internet, the World Wide Web, an Intranet, a local area networks (LANs), or the like.

The proxy servers 24 and the content server 20 may comprise various commercially available computers. For example, proxy server 24 may be embodied as the Internet Connection Server (ICS) sold by IBM. Similarly, the content server 20 may be embodied as a Lotus Go Web server, a Lotus Domino server, or the like. The proxy server 24 or content server 20 can run on any computing node, which includes, but is not limited to, products such as are sold by IBM under the trademarks S/390 SYSPLEX, SP2, or RS6000 workstations. In sum, the proxy server 24 or the content server 20 may comprise any general purpose computer and associated software which can provide World-Wide-Web page accesses, remote file transfers, electronic mail, and transaction support to clients 22.

The data processing system of FIG. 1 may use the attributes of a conventional proxy hierarchy to maintain data transfer efficiency. For instance, if a requested object is not available locally on a lower-level proxy server, a request for the non-available object is made to the next higher-level proxy. If the higher-level proxy has previously cached the object in its cache memory, the higher-level proxy will pass down the requested object to the client via the lower-level proxy server. Otherwise, the higher-level proxy server will try to obtain the object from its next higher level proxy. Once the requested object is obtained, it is passed down to the lower-level proxy or the client requesting the object.

Figure 2:
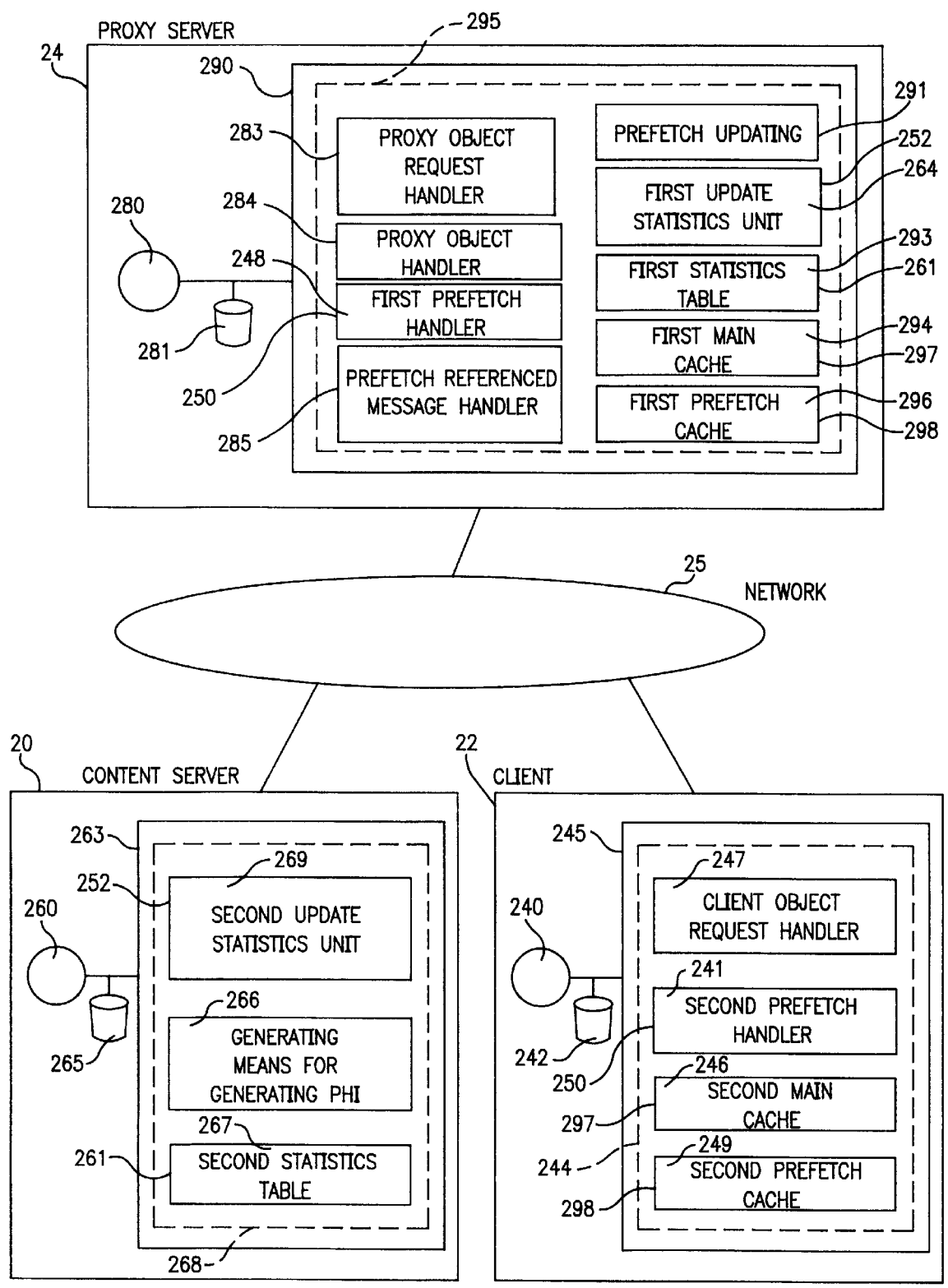
FIG. 2 is a further block diagram of a content server, a client, and a proxy server in greater detail than FIG. 1.

FIG. 2 depicts a more detailed example of the data processing system than is depicted by FIG. 1. The data processing system includes the proxy server 24, the content server 20, the network 25, and the client 22. The data processing system preferably includes prefetching unit 250, statistics tables 261, statistics updating unit 252, main caches 297, and prefetch caches 298.

The prefetching unit 250 preferably includes a first prefetch handler 248 in the proxy server 24 or a second prefetch handler 241 in the client 22, or both the first prefetch handler 248 and the second prefetch handler 241. Statistics tables 261 preferably include a first statistics table 293 associated with the proxy server 24 and a second statistics table 267 associated with the content server 20. The statistics updating unit 252 optimally includes a first update statistics unit 264 for updating the first statistics table 293 and a second update statistics unit 269 for updating the second statistics table 267. The main caches 297 optimally include a first main cache 294 in each proxy server 24 and a second main cache 246 in each client 22. The prefetch caches 298 include a first prefetch cache 296 in the proxy server 24 and a second prefetch cache 249 in the client 22.

Figure 10:
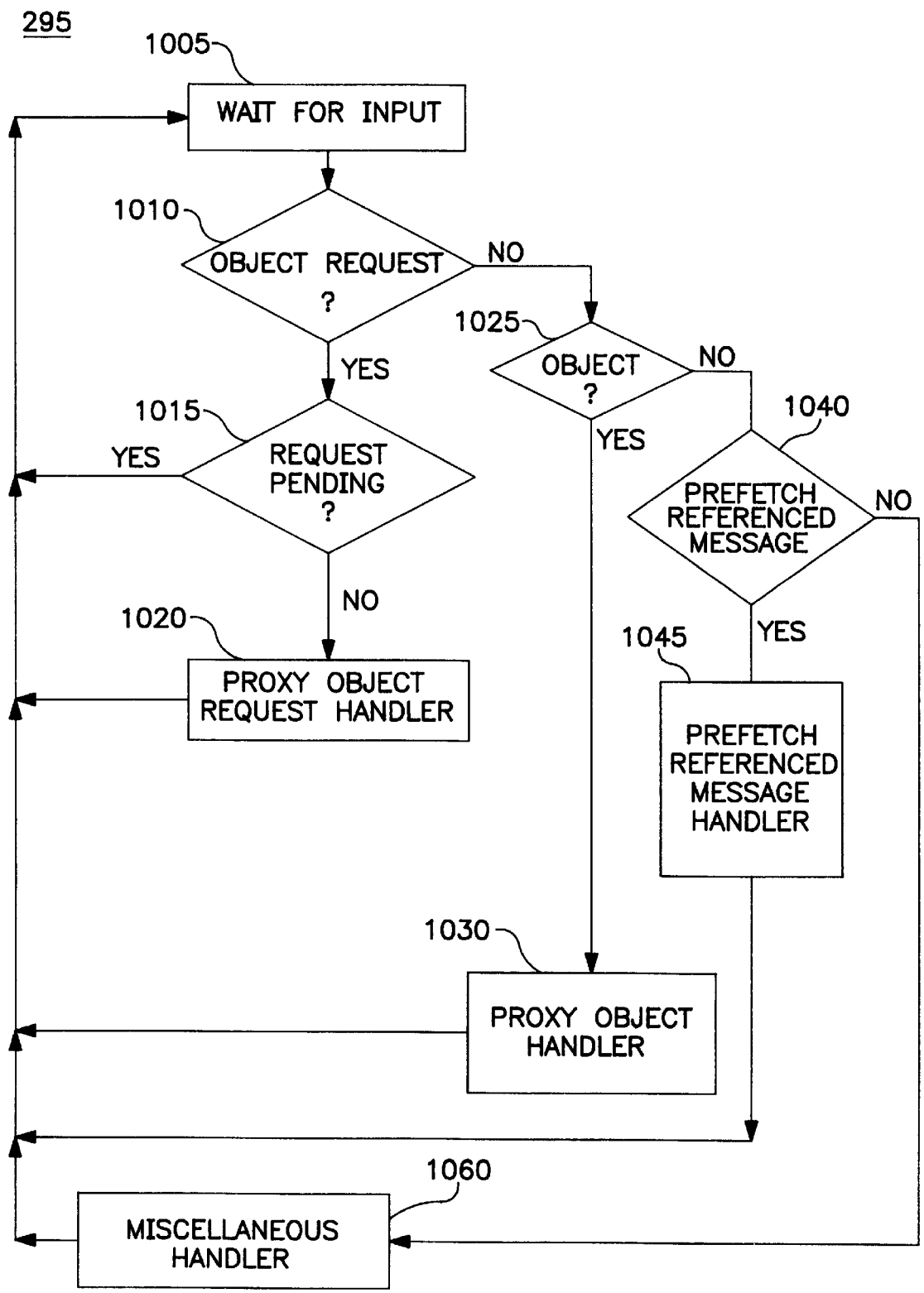
FIG. 10 is a flow chart diagram illustrating operation of the proxy server in accordance with an exemplary embodiment of the present invention.

A proxy server 24 is a computing node that can serve requests through the network 25. The proxy server 24 preferably includes a first processor 280, a first memory 290, and a first storage unit 281. The first memory 290 may comprise, for example, random access memory (RAM). The first storage unit 281 may comprise, for example, a direct access storage device (DASD). The first memory 290 stores a proxy server logic 295, which is preferably embodied as a computer executable code. The proxy server logic 295 is preferably loaded from the first storage unit 281 into the first memory 290 for execution by the first processor 280. Details of the proxy server logic 295 are shown in FIG. 10.

The proxy server logic 295 includes a proxy object request handler 283, a proxy object handler 284, the first prefetch handler 248, a prefetch referenced message handler 285, a prefetch updating means 291, the first update statistics routine 264, a first statistics table 293, a first main cache 294, and a first prefetch cache 296.

Figure 5:
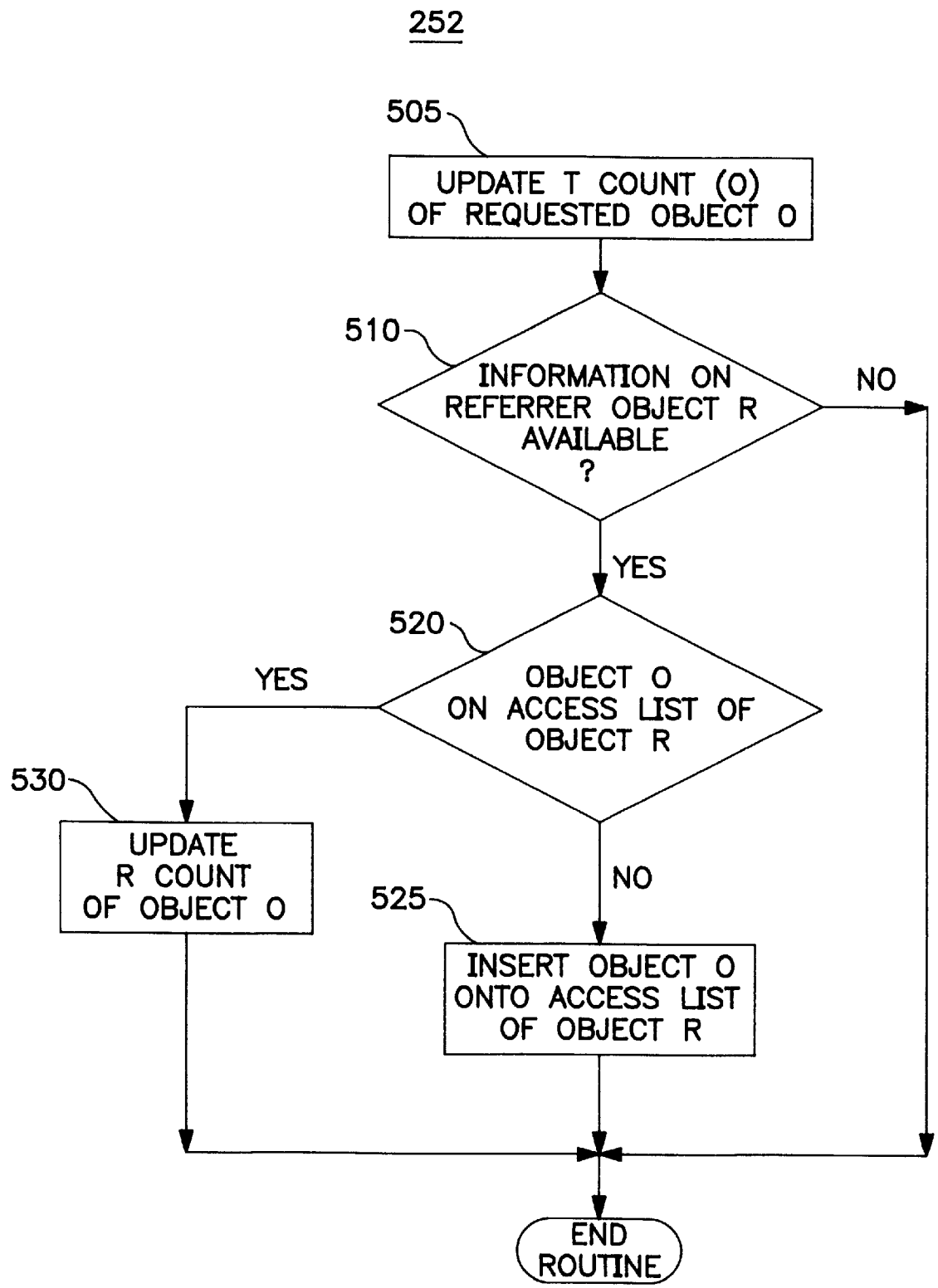
FIG. 5 is a flow chart diagram illustrating statistics updating in accordance with an exemplary embodiment of the present invention.
Figure 11:
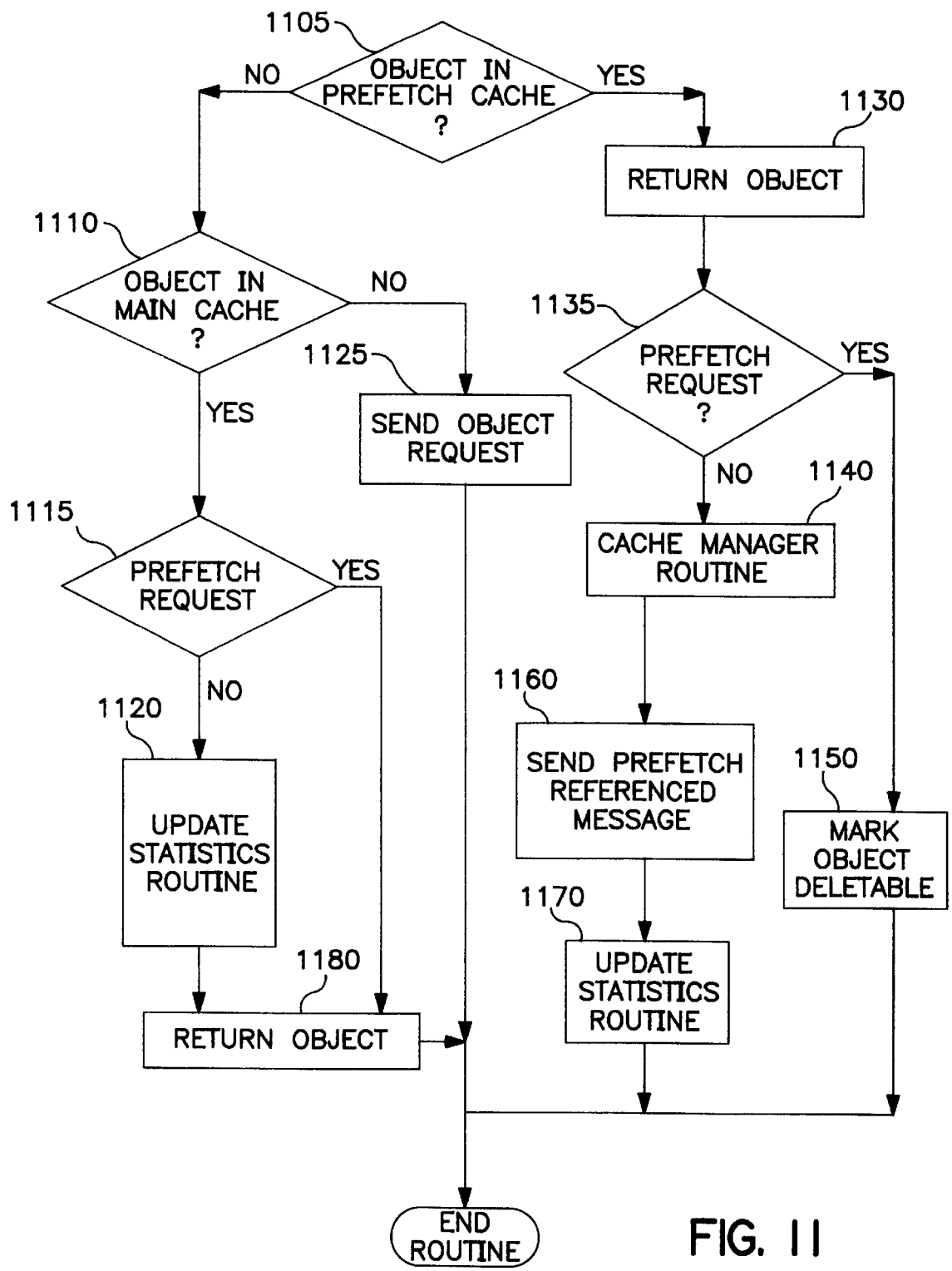
FIG. 11 is a flow chart diagram illustrating operation of a proxy object request handler in accordance with an exemplary embodiment of the present invention..
Figure 12:
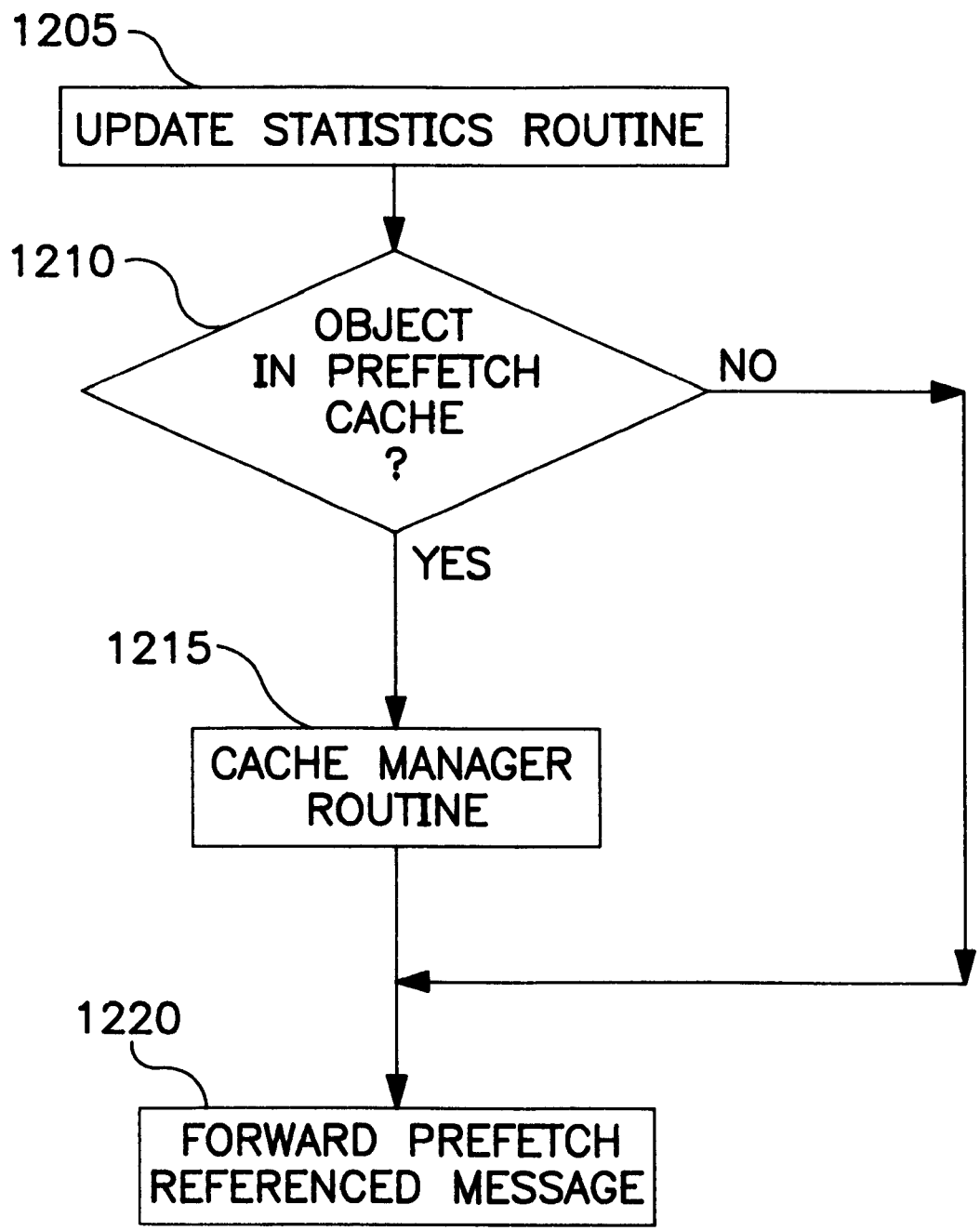
FIG. 12 is a flow chart diagram illustrating operation of a prefetch referenced message handler in accordance with an exemplary embodiment of the present invention.
Figure 13:
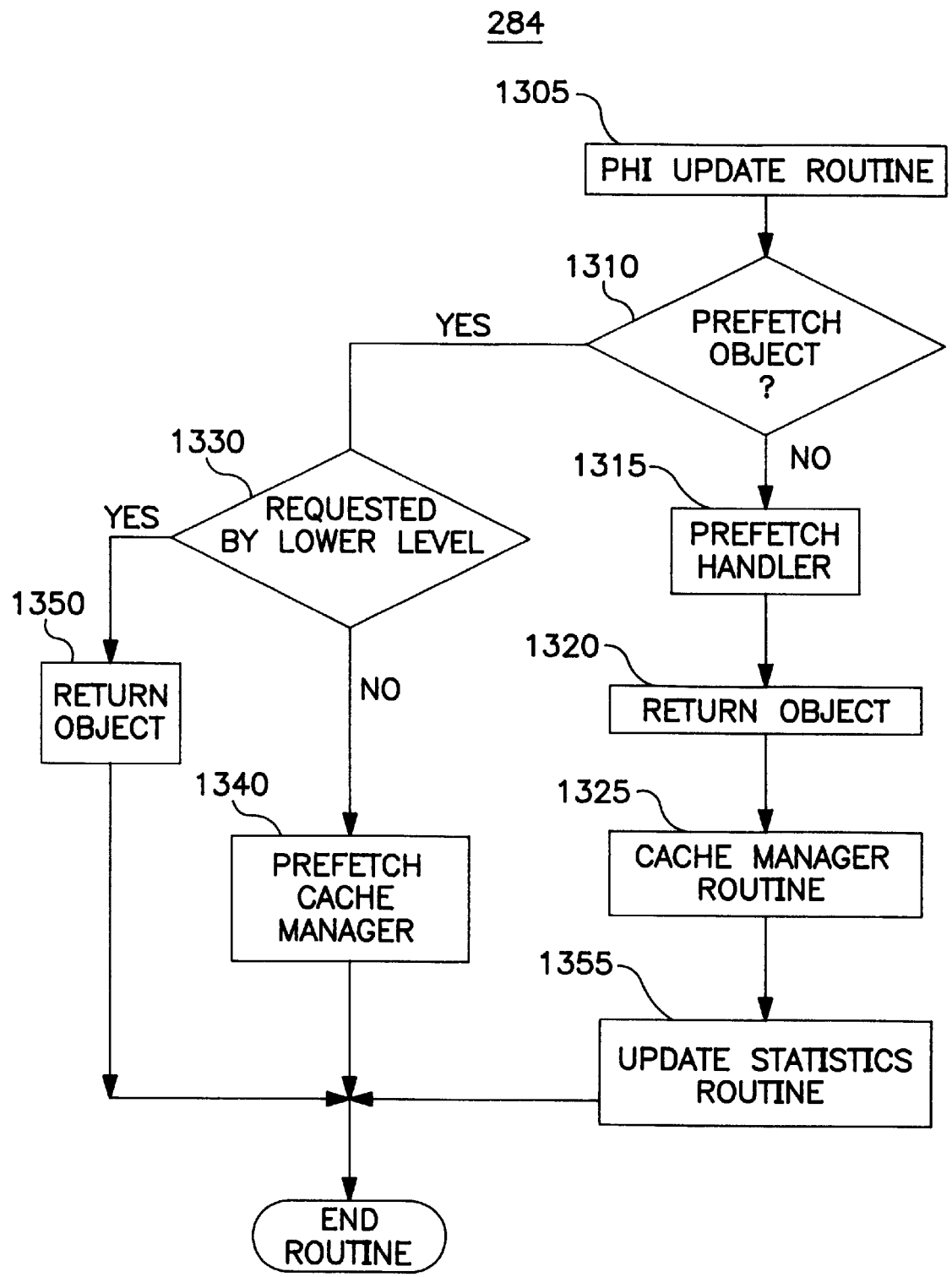
FIG. 13 is a flow chart diagram illustrating operation of a proxy object handler in accordance with an exemplary embodiment of the present invention.

Details of the proxy object request handler 283 are depicted in FIG. 11. Details of the proxy object handler 284 are shown in FIG. 13. A prefetch referenced message handler 285 is shown in FIG. 12. Details on the statistics updating unit 252 or the first update statistics routine 264 are shown in FIG. 5.

Figure 8:
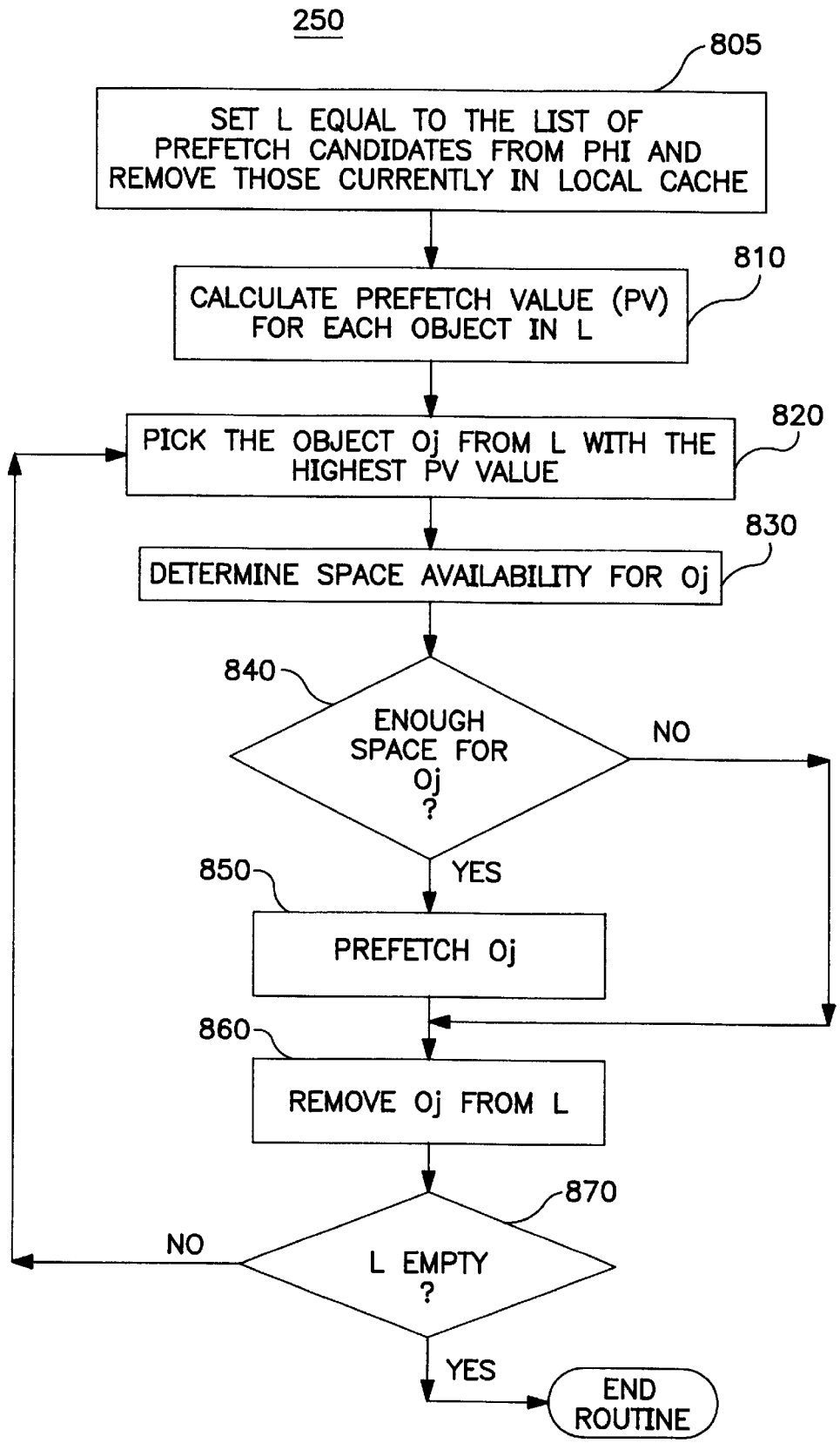
FIG. 8 is a flow chart diagram illustrating prefetching in accordance with an exemplary embodiment of the present invention.
Figure 14:
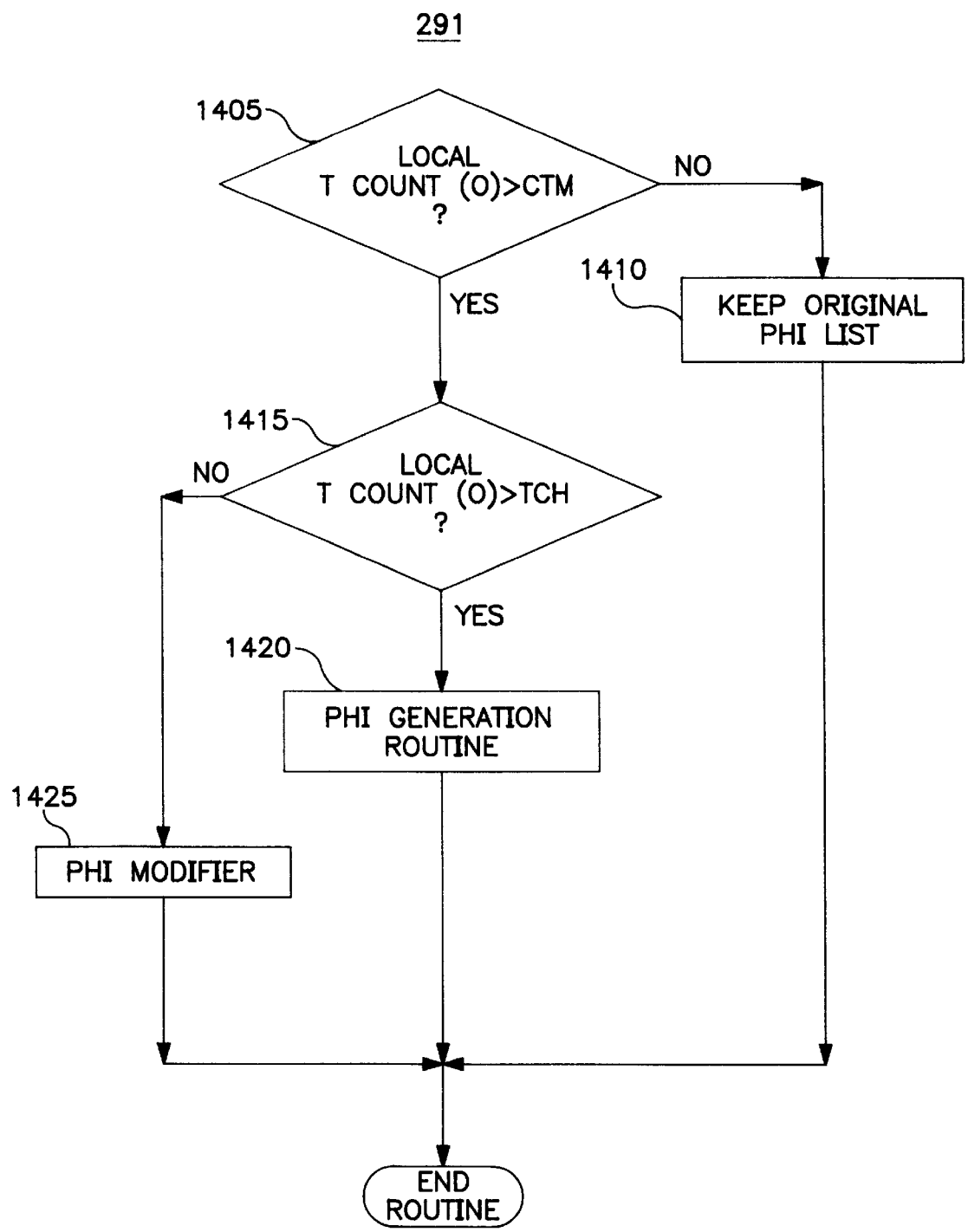
FIG. 14 is a flow chart diagram illustrating operation of a prefetch hint information update routine in accordance with an exemplary embodiment of the present invention.

The prefetching unit 250 or first prefetch handler 248 is shown in detail in FIG. 8. The prefetch updating unit 291 or prefetch hint information update routine is shown in FIG. 14. The proxy server logic 295 maintains the first main cache 294 and the first prefetch cache 296.

The content server 20 is a computing node that can serve requests through the network 25. The content server 20 preferably includes a second processor 260, second memory 263, and second storage unit 265. The second memory 263 may comprise, for example, random access memory (RAM). The second storage unit 265 may comprise, for example, a direct access storage device (DASD). The second memory 263 stores the content server logic 268 or content server software.

The content server logic 268 is shown subsequently in greater detail with reference to FIG. 4. The second statistics table 268 is desirably embodied as computer executable code which is preferably loaded from the second storage unit 265 into the second memory 263 for execution by the second processor 260. The content server logic 268 includes a second statistics table 267, a second update statistics unit 269 for updating the second statistics table 267, and generating unit 266 for generating prefetch hint information. The second statistics table 267 stores information on requested information by the clients and potential prefetch information associated with the requested information. The statistics tables 261 contribute to the generation of prefetch hint information which his based on actual reference behavior of clients. Details on the statistics tables 261 are illustrated in FIG. 3B.

Operation of the second update statistics unit 269 is shown in greater detail with reference to FIG. 5. The generating unit 266 generates prefetch hint information from the information in the second statistics table 267 and the requested information. The generating unit 266 may be embodied as prefetch hint information (PHI) generation routine depicted in FIG. 6.

The client 22 preferably includes a third processor 240, a third memory 245 and a third storage unit 242. The third memory 245 may comprise, for example, random access memory. The third storage unit 242 may comprise, for example, a direct access storage device (DASD). The third memory 245 stores the client logic 244 or client software. The client logic 244 is subsequently shown in greater detail with reference to FIG. 7. The client logic 244 is embodied as computer executable code which is preferably loaded from the third storage means 242 into the third memory 245 for execution by the third processor 240.

Figure 9:
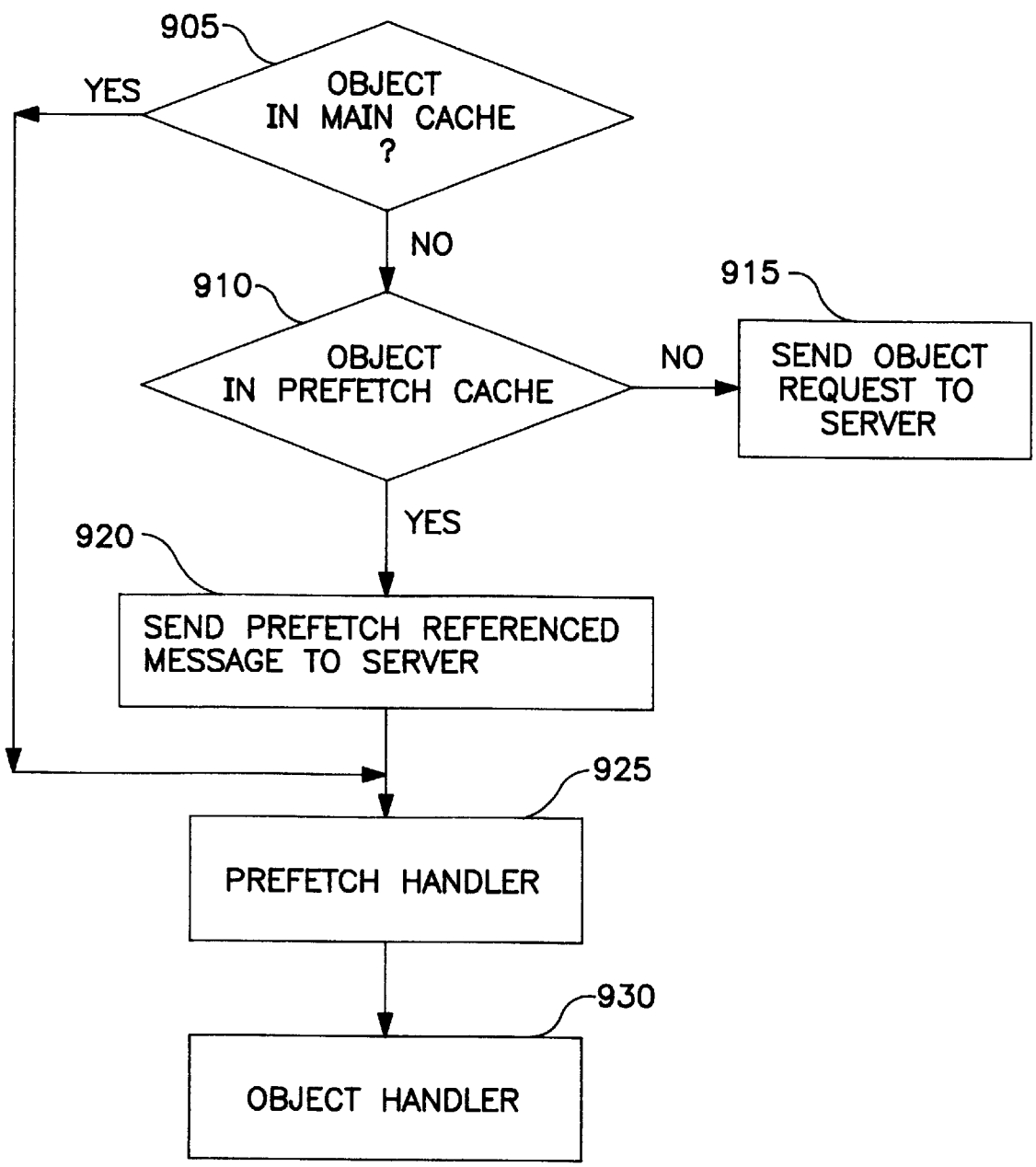
FIG. 9 is a flow chart diagram illustrating operation of a client object request handler in accordance with an exemplary embodiment of the present invention.

The client logic 244 includes a client object request handler 247, the second prefetch handler 241, a second main cache 246, and a second prefetch cache 249. The client object request handler 247 obtains requested objects for the client from the second main cache 246, the second prefetch cache 249, a proxy server 24, or a content server 20. The details of the client object request handler 247 are shown in FIG. 9.

The client logic 244 maintains the second main cache 246 and the second prefetch cache 249. The second main cache 246 is used for storing frequently referenced objects, while the second prefetch cache 249 is used for storing objects before they actually get referenced. Prefetch objects are objects that have not been proximately or previously referenced yet in conjunction with referenced objects. In the preferred embodiment, the main caches 297 are managed by the conventional LRU (least recently used) algorithm. Those skilled in the art will also appreciate that any other replacement strategy can be applied to maintain the main caches 297.

The main caches 297 and prefetch caches 298 may be logically separated. The logical separation of the prefetch objects from the actually referenced objects in the main cache 297 is to prevent the prefetch objects from taking too much storage space. Various alternatives are available to achieve this objective of a logically separated prefetch cache and main cache. For example, a single cache may have an upper limit imposed on the number of prefetch object and/or an upper limit imposed on the space occupied by the prefetch objects. The main cache 297 and the prefetch cache 298 are meant to support different goals. The main cache 297 is to cache popular objects which have the potential to be repeatedly referenced. The prefetch cache 298 is only used to support a particular browsing session by prefetching what are most likely to get referenced next in that session. Under the preferred embodiment, if a lower level node in the hierarchy issues a prefetch request on an object in the prefetch cache of a higher level node, the object will be passed down to the lower level node and be marked as deletable from the prefetch cache 298 of the higher level node since the objective of the prefetch has been accomplished. When a prefetch object actually gets referenced, it may be moved to the main cache 297 depending upon the management policy of the main cache 297. Under the preferred embodiment using an LRU replacement policy, a prefetch object once referenced is moved to the main cache.

An alternative criterion can be devised for admitting an object from the prefetch cache 298 into the main cache 297. In Abrams et al., "Caching Proxies: Limitations and Potentials", Proc. 4th International World Wide Web Conference, 1996, some cache replacement policies have been discussed which do take object size into account in the decision making process. Other cache replacement strategies are known to one of ordinary skill in the art.

Figure 3A:
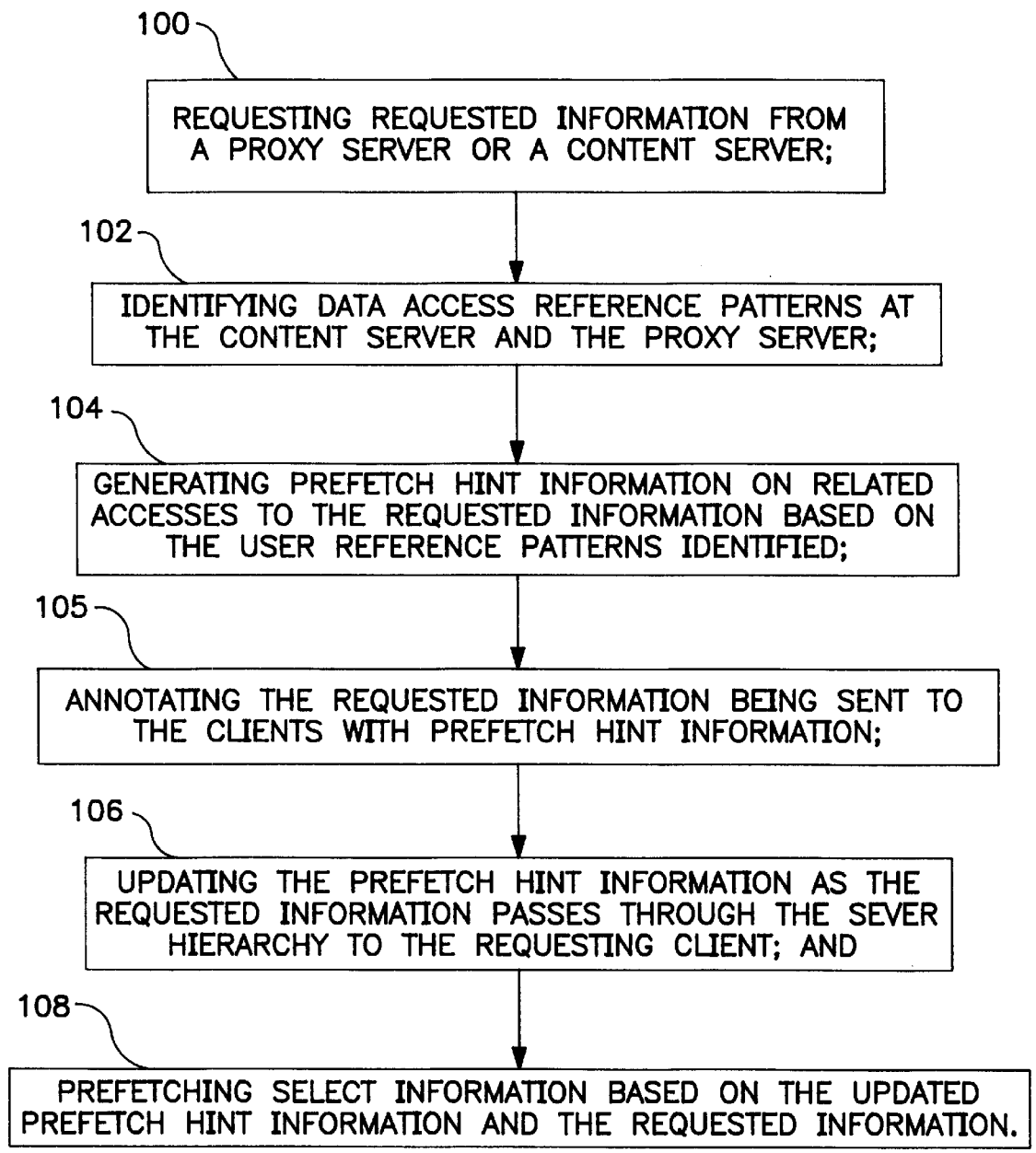
FIG. 3A is a flow chart diagram illustrating a method for dynamically prefetching data from a content server via a hierarchy of proxy servers in accordance with an exemplary embodiment of the present invention.
Figure 3B:
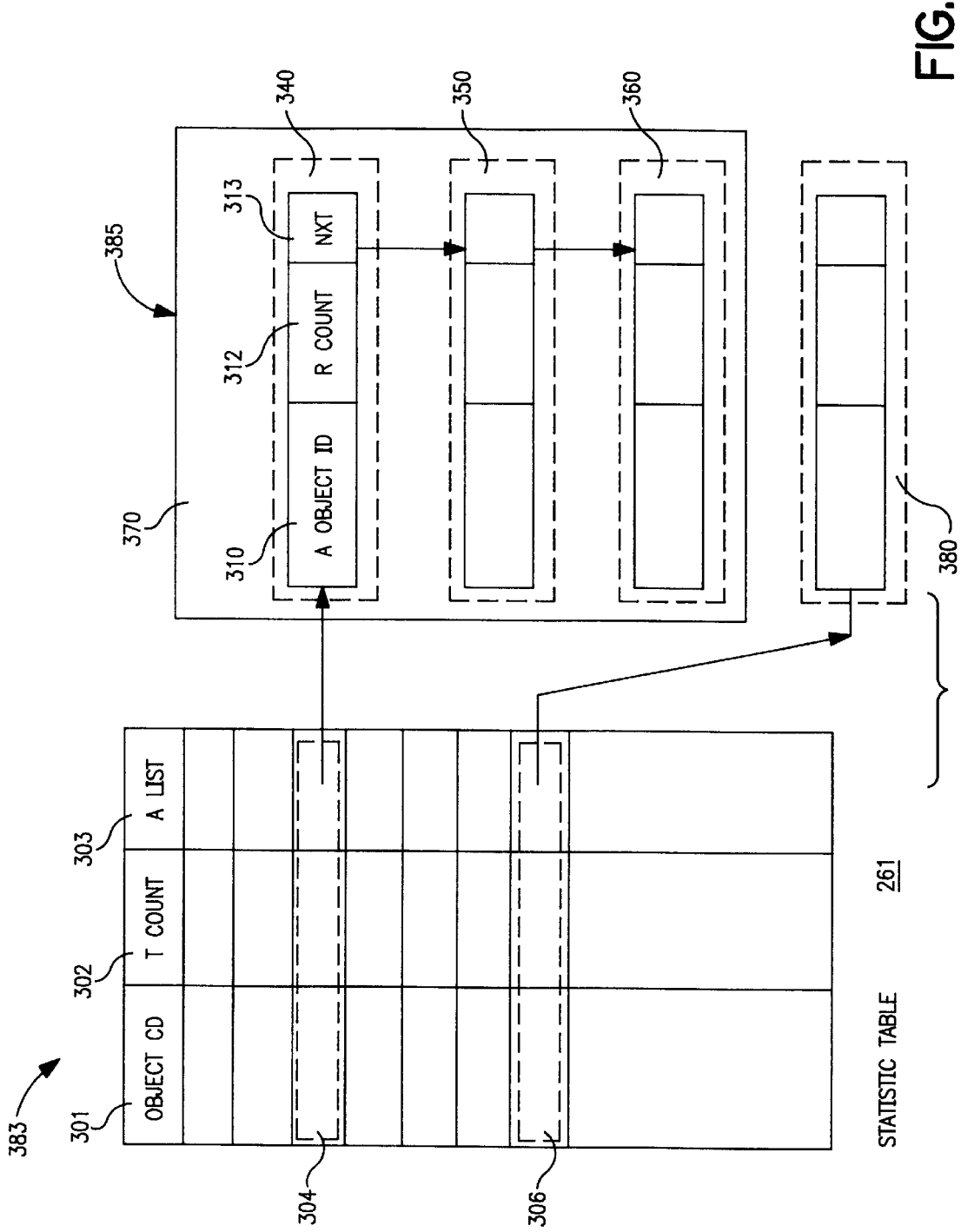
FIG. 3B is an illustrative example of a statistics table.

FIG. 3A is a flow chart diagram illustrating a method for dynamically prefetching data for clients from a content server 20 or a proxy server hierarchy. First, in block 100 a client requests requested information from a proxy server or a content server 20. Second, in block 102 historic data access or data reference patterns at the content server 20 and proxy servers are identified. In practice, the order of completing blocks 100 and block 102 may be reversed.

Third, in block 104 the content server 20 generates prefetch hint information (PHI) on related accesses to the requested information based on the data reference patterns identified in block 102. Fourth, in block 105 the prefetch hint information may annotate the requested information. For example, the prefetch hint information may be conveyed as meta data piggy-backed with the requested information (i.e. object). With respect to the step of establishing or generating prefetch hint information, content servers 20 track usage/reference patterns from a large number of concurrent users or clients. In practice, the content servers 20 determine which group of objects are related to the requested information or requested object. The content servers 20 generates and provide a prefetch hint information (PHI) with the requested object. In the prefetching step or immediately prior thereto, proxy servers may interpret the PHI in light of local considerations to decide which select objects to prefetch.

Fifth, in block 106 the prefetch hint information gets updated as the requested information passes through the proxy server hierarchy. The updating in block 106 reflects prefetch operations performed and caching status at the higher levels hierarchy, and other local considerations such as local reference patterns. The proxy servers may modify the PHI to reflect its prefetch decision and various local considerations before passing the object to the next (lower) level proxy or the client station. As an object passes through the proxy hierarchy, the sending node sets an initial PHI, while the receiving node may derive a final PHI from the initial PHI. The final PHI defines which select objects to prefetch based on the requested objects. The prefetch operation and decision is receiver-initiated, not sender-initiated.

Finally, in block 108 select information in prefetched based on prefetch hint information and the request information. The proxy server or client decides whether to prefetch a subset of objects specified in the PHI based on the PHI information in the received object, the locally maintained reference information (if available) and other local consideration such as available storage size, and access time.

Generating prefetch hint information in block 104 preferably uses the PICS protocol or a PICS compatible format. A PHI generated in block 104 is stored with each cached object as part of its meta data so that when a cached object is requested, the PHI information of the object can be examined to initiate the appropriate prefetch operations. The PHI information can be provided through the PICS protocol. The PICS protocol provides information on the criticality of each PHI object and its characteristics such as size, and caching status on the higher hierarchy.

Updating the prefetch hint information may be accomplished through the proxy server hierarchy. The proxy servers may collect local information and distribute or decentralize the prefetch decision down the proxy hierarchy. Furthermore, the information of which intermediate proxy has prefetched an object could have implication on the prefetch decision of the lower level proxies and the client station in order to optimize the storage and bandwidth usage.

The proxy servers in the proxy server hierarchy cooperate with each other to provide a receiver-oriented, prefetch decision. The prefetch decision may be made collaboratively by each proxy and client. Prefetch hint information in the format of meta information annotates (i.e. piggy-backs) requested objects. The prefetch hint information provides information on potential prefetch candidates. Intermediate proxy servers may modify the meta information or prefetch hint information based on local conditions, and store the meta information with an object when it is cached, so prefetch can be triggered upon later reference to the object.

FIG. 3B illustrates a data format of the statistics table 261. The statistics table 261 shall refer generally to either the first statistics table 293 or the second statistics table 267. One or more proxy servers 24 maintain the first statistics table 293. The content server 20 may maintain the second statistics table 267. The format for the first statistics table 293 and the second statistics table 267 are preferably substantially similar or identical to promote updating of the statistics table 261 at different proxy servers in the proxy server hierarchy. The statistics table 261 helps provide prefetch hint information (PHI) based on actual viewer reference behavior from the view point of the proxy server or the content server 20 with which the statistics table 261 is associated. The statistics table 261 is capable of observing the references of all of the communicative clients beneath it in the proxy server hierarchy.

For example, in FIG. 1, the first statistics table 293 in the first level-three proxy server 50 tracks the aggregate data access behavior of the first client 600 and the second client 603. Meanwhile, the first statistics table 293 in the second level-three proxy server 55 tracks the aggregate data access behavior of the third client 700 and the fourth client 703. The first statistics table in the first level-two proxy server 40 tracks the aggregate behavior of the first client 600, the second client 603, the third client 700, and the fourth client 703. Although the lower level proxy, such as the first level-three proxy server 50, may be better able to track the interests of the client 600, the lower level proxy may not be able to get enough reference statistics from a sufficient sample size of clients to provide meaningful prefetch hint information (PHI). In the preferred embodiment, when an object O is requested from the content server 20, the server 20 provides the initial prefetch hint information PHI based on the information in its second statistics table 267. As the object O passes down the proxy hierarchy, any proxy server 24 along the path to the client 22 can modify the prefetch hint information (PHI) in the object header to tailor the PHI to the local observation in the first statistics table 293, if there is enough local reference to the object O. The first statistics table 293 may supersede the second statistics table 267 based upon factors such as the well-indexed interests or preferences of a particular client by a lower level proxy server.

In the preferred embodiment, the content server 20 maintains a second statistics table 267, which is a database of data access frequencies of the clients 22 with respect to requested information. The database could be expanded to include data access frequencies of requesting proxy servers 24. Similarly, one or more proxy servers 24 maintain a first statistics table 293. The statistics table 261, for example, has a first array 383 with a first data structure 304 and a second data structure 306. As shown, the first data structure 304 and the second data structure 306 are records. Each record in the statistics table 261 consists of several fields, including parent object identifiers 301 (i.e. ObjectId), first counts 302 (i.e. TCount), and access list data pointers 303 (i.e. Alist).

The parent object identifier field 301 contains the object identifier. For example the parent object identifier 301 contains the URL of the object for Internet or related applications. The first count field 302 contains the number of times the parent object, associated with the parent object identifier, is referenced as observed by the server. That is, the first count field 302 contains the frequencies of actual requests for requested objects. The first count 302 represents a parent-object access frequency. The access list data pointer 303 contains a data pointer to an access list 370.

The statistic table 261 has an access list 370, which, for example, contains a first access record 340, a second access record 350, a third access record 360, and a fourth access record 380. As illustrated, the parent object identifier associated with the first data structure 304 has an access list 370 which consists of a linked list of the first access record 340, the second access record 350, and the third access record 360. The next record data pointer field 313 contains a pointer to the next access record on the access list 370 associated with a particular parent object identifier 301. The access list for parent object identifier 301 associated with the second data structure 306 only contains the fourth access record 380.

Each record or data structure on the access list consists of several fields, including a child object identifier 310 (i.e. AObjectId), a second count 312 (i.e. RCount), and a next record data pointer 313 (i.e. Nxt). The data structures may be in the format of general data structure, records, or second arrays. As illustrated in FIG. 4, the data structures are records which form a linked list within the access list 370.

In an alternative embodiment, the data format of the statistics table may include a primary array related to a plurality of alternate secondary arrays in a tree structure. The primary array would contain information related to the parent objects and the secondary array would contain information on the child objects of corresponding parent objects.

The child object identifier field 310 contains the object identifier (URL) of an object. The parent object identifier 301 is related to one or more child object identifiers 310 on the access list. The child object identifiers 310 identify the potential prefetch candidates if the child's parent object is actually referenced. The second count 312 contains the number of times the child object is referenced through its parent object. In other words, the second count is the frequency in which the child object is referenced subsequently, temporally and proximately to the prior reference of an associated parent object. The second count 312 represents a child object-access frequency.

The child object identifiers 310 on the access list 370 can be obtained dynamically based on observation of actual reference behavior of the clients. For example, in HTML, a Web page can have HTTP links to other Web pages. Those Web pages indicated by the HTTP links are potential child objects to the (parent) Web page containing the HTTP links. When the parent object is being viewed, if a reference (HTTP) link contained in the parent object is clicked, the corresponding child object gets referenced. A child object can have more than one parent as a reference link to the child object can be included in multiple other parent objects. Under the HTTP protocol, the request for the child object contains the parent URL as referrer information in its header. So the server can dynamically relate a subsequent child reference to its parent (through the referrer information in the child's header). If a client frequently clicks or selects a child object, the child object may become a prefetch candidate or select information.

In addition to dynamically tracking the viewer reference behavior, static analysis or mining on Web logs can be performed periodically to derive information on group of objects for the statistics table 261. The mining algorithm identifies groups of objects that are referenced together to obtain potential prefetch candidates for PHI. One method for mining Web logs to derive reference pattern is described in: "SpeedTracer: A Web Usage Mining and Analysis Tool", by Kunlung Wu, et al., IBM Research Report 20895, May 1997. The SpeedTracer algorithm provides information on frequent groups of pages referenced together in a user session and the frequent traversal path. The SpeedTracer algorithm is an in-depth type of mining that can uncover related references that are not immediately referenced together. It can also make better prediction on the next set of referenced objects based on the traversal path to a given object.

Other types of data mining algorithms can be used to identify data access patterns for the statistics table 261. For example, other data mining algorithms include classification and clustering, which can also be applied to the Web log analysis to obtain reference patterns. Furthermore, the PHI can also be supplied by the content provider based on its knowledge of the object relationships. For example, PHI can include, but is not limited to, patches and upgrades for requested software download, Java classes for the requested JAVA applet, and objects (such as GIFs) contained within the requested objects.

In the preferred embodiment, when collecting statistics, actual referencing of an object by a client station is distinguished from a prefetch request to an object. The first count 302 (i.e. TCount) and the second count 310 (i.e. RCount) in the statistics table 261 reflect actual references, not prefetching. That is to say a prefetch operation will not result in an update to the first statistics table 293 or the second statistics table 267, only actual object references will.

The prefetch hint information or the prefetch hint information list may use various data structures for annotating requested information or requested objects. For example, prefetch hint information may be communicated between requester and server nodes using piggybacked meta data. In a HTTP implementation, the information exchange can be included as meta data in an object header using existing web protocols. PICS ("Platform for Internet Content Selection") specifies a method of sending meta-information concerning electronic content. PICS is applicable to the (a) annotation of the requested information, (b) prefetching select information, prefetch candidates, or child objects, and (c) acknowledging prefetching operations after information is prefetched.

PICS is known to one of ordinary skill in the art as a Web Consortium Protocol Recommendation. PICS was first used for sending values-based rating labels, such as "How much nudity is associated with this content," but the format and meaning of the meta-information is fully general. In PICS, meta-information about electronic content is grouped according to the "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as "PICS label") may contain expiration information. There are also facilities for permitting a PICS label to apply to more than one piece of electronic content. Each PICS label for a specific piece of electronic content may be added or removed from the content independently.

For example, an image file may be sent from a server with a PICS label whose "rating service" field indicates it contains values-based rating labels according to the "SafeSurf" rating system. According to the present invention, as it passes through an enterprise proxy, the image file may get a new updated category value for the PICS label to reflect the local consideration of the "rating service". Thus, the client computer will only see the new category value of the PICS label. The HTTP protocol has been augmented so that its request headers and response headers support PICS. The technical bodies which define other common application protocols, such as NNTP, are now also considering adding PICS support. As part of these protocols, a list of the types of PICS labels desired may be included with a request. PICS also specifies a query format for requesting PICS information from a central label bureau server.

A sample PICS label is: (PICS-1.1 "http://the.rating.service" labels for "http://the.content" exp "1997.07.09T08: 15-0500" r (n 4 s 3 v 2))where the 'n' 's' 'v' are transmit names for various meta-information types, and the applicable values for this content are 4 (for n), 3 (for s), and 2 (for v). Only software which recognizes the ID "http://the.rating.service" would know how to interpret these categories and values.

In a preferred embodiment, three different kinds of PICS labels are introduced. The first kind of PICS label, referred to as a prefetch label (i.e. P-label), is used by the server node to provide PHI. The second kind of PICS label, referred to as a request label (i.e. R-label), is used to request the prefetch candidate objects. The third kind of PICS label, referred to as a reference label (i.e. X-label), is used to provide feedback on the effectiveness of the prefetch, based on which prefetch objects actually get referenced.

The prefetch label can include, but is not limited to, any combination of the following categories including an identifier category, a probability category, a size category, and a caching category. The identifier category (i.e. ID category)

has a value that conveys the URL of the prefetch candidate. The probability category (i.e. PROB category) has a value that conveys an estimate of the usefulness of the prefetch. In the preferred embodiment, an estimate of the reference probability is used. The reference probability indicates the probability that the prefetch candidate gets referenced. The size category has a value that conveys the size or memory requirements of the prefetch candidate. The caching category has a value that conveys information on any higher level proxy server that has a copy of the prefetch candidate object either in its first main cache 294 or its first prefetch cache 296. In the preferred embodiment, only the closest higher level proxy is identified.

The request label can include, but is not limited to, the following categories, including the identifier category (i.e. ID category). The value of the identifier category conveys the URL of the object to be prefetched. In the preferred embodiment, when a (proxy or client) node wants to prefetch a suggested prefetch candidate object, a HTTP head request is sent back to the content server 20 through the proxy hierarchy using the request label to convey the URL of the object to be prefetched. When a proxy server 24 receives a prefetch request from a lower hierarchy node, it will serve the request if the object is in its main or prefetch cache. Otherwise, it forwards the prefetch request to the next higher level proxy.

The reference label can include, but is not limited to, the following categories, including the object identifier category (Object-ID category) and the referrer identifier category (Referrer-ID category). The object identifier category has a value that conveys the URL of the prefetched object that gets referenced. The referrer identifier category has a value that conveys the URL of the object that contains in its PHI the object indicated by the object identifier category value.

In the preferred embodiment, when a prefetch object actually gets referenced, a HTTP head request is sent back to the content server 20 through the proxy hierarchy using the reference label to convey the URL of the prefetch object referenced and its referrer object. This type of HTTP head request is referred to hereinafter as the prefetch referenced message. When a proxy server 24 receives a prefetch referenced message from a lower hierarchy node, it updates its first statistic table 293 and forwards the request to the next higher level proxy server.

Figure 4:
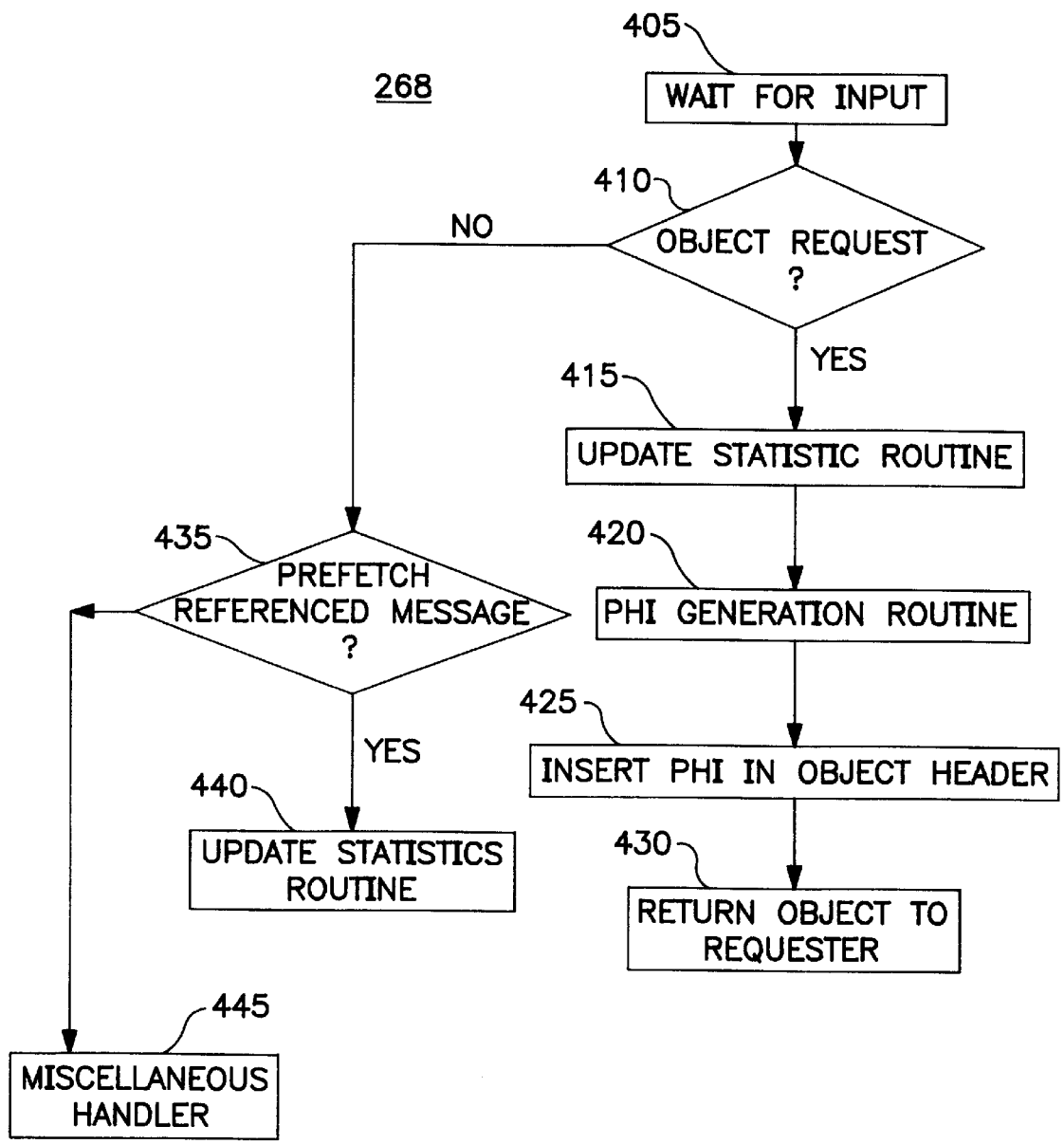
FIG. 4 is a flow chart diagram illustrating operation of the content server in accordance with an exemplary embodiment of the present invention.

FIG. 4 depicts an example of a server logic 268 having features of the present invention. The server logic 268 updates the second statistics table 267 in the content server 20. The updating of the second statistics table 267 is triggered by an object request from a client 22. The content server 20 preferably generates prefetch hint information for annotation or insertion into the object header of the object prior to sending the requested object to the client 22.

Starting at reference block 405, the content server 20 waits for input. In decision symbol 410, if the input received is an object request for object O, the statistics updating unit 252 or second update statistic routine 264 is invoked in reference block 415. In reference block 420, generating unit 266 for generating prefetch hint information 266 or a prefetch generation routine is invoked. A detailed example of the generating unit 266 or PHI generation routine is later described with reference to FIG. 6. In reference block 425, the PHI is, for example, inserted into the object header of the requested object. The prefetch hint information may otherwise annotate the requested object or requested information in block 425. In the preferred embodiment, the PICS protocol may be used to annotate the requested object. The PHI is captured in the P-label, where the identifier category value reflects the URL of the prefetch candidate. In block 430, the requested object is returned to the requesting client or the requesting proxy server. In decision symbol 435, if the input received is a prefetch referenced message (i.e. a HTTP head request with the X-label indicating that a prefetch object O actually gets referenced) the statistics updating means 252 or the second update statistics routine 269 is invoked in step 440. For other types of inputs, which are not the focus of the present invention, such as an FTP (file transfer protocol) request, an appropriate miscellaneous handler in reference block 445 can be invoked.

FIG. 5 shows how the statistics updating unit 252 updates one of said statistics tables 261. The statistics updating unit 252 refers to the first update statistics routine 264 for updating the first statistics table 293 or the second update statistics routine 269 for updating the second statistics table 267, or both the first update statistics routine 264 and the second update statistics routine 269. The statistics table 261 refers to either the first statistics table 293 or the second statistics table 267. The statistics tables 261 refer to both the first statistics table 293 and the second statistics table 267. The statistic updating unit 252 first looks for information in a referrer object. The requested object is then placed on an access list or a prefetch list of the referrer object.

Beginning at reference block 505, the statistics table 261 is updated to reflect that object O has been referenced one more time by incrementing the first count. In other words, in block 505 TCount(O) is incremented by one. If object O is not yet in the statistics table 261, a parent object identifier is inserted into the statistics table 261 with TCount(O) initialized to one. The new parent object identifier replaces the least recently referenced entry in the statistics table 261, if no empty slot is available in the statistics table 261. In decision symbol 510, the requested object is checked for referrer information by, for instance, checking the object header of the requested object. For example, in HTTP protocol, referrer object is provided in the header to indicate which object contains the HTTP link to the requested object. If a referrer object (R) is found in the header, in step 520 the statistics table 261 is examined to see whether object O is already on the access list of object R. If so, the second count (i.e. RCount(O)) is incremented by one in block 530 for the requested object. Otherwise, in block 525 the requested object (i.e. Object O) is inserted into the access list of the child object (i.e. object R) with the second count (i.e. RCount(O)) initialized to one.

Figure 6:
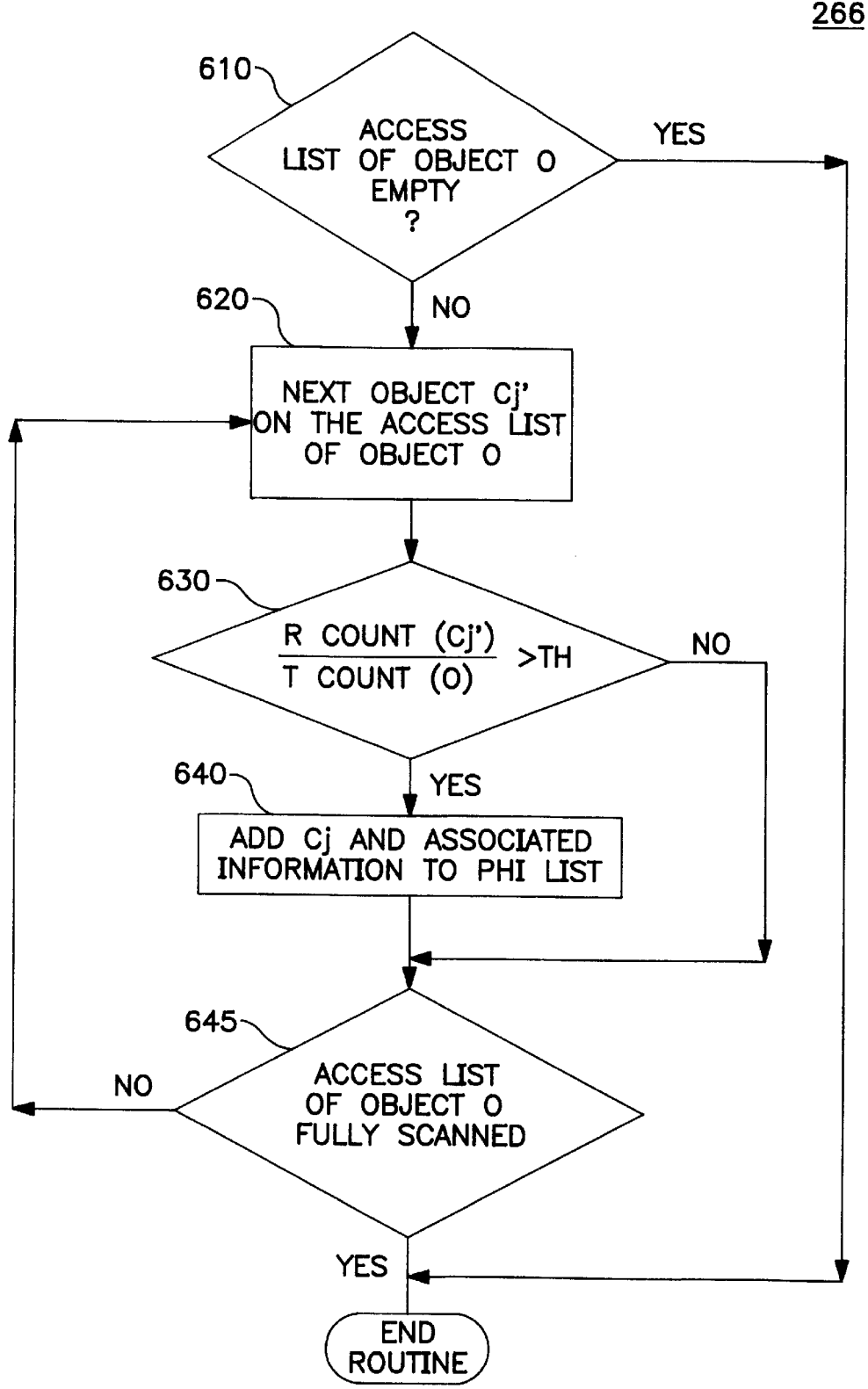
FIG. 6 is a flow chart diagram illustrating generating of prefetch hint information in accordance with an exemplary embodiment of the present invention.

FIG. 6 depicts an example of the generating unit 266 for generating prefetch hint information into a prefetch hint information list. The prefetch hint information list contains child object identifiers of child objects if the ratio of the second count to the first count exceeds a hint threshold. The prefetch hint information list represents a refined or filtered access list. That is, the generating unit 266 accepts inputs from the statistics table 261 and filters the inputs to obtain the prefetch hint information list.

The generating unit 266 for generating prefetch hint information represents a prefetch hint information (PHI) generation routine 266, which begins in reference block 610. In reference block 610, the access list of a parent object (i.e. object O) is checked to see whether or not it is empty (i.e. whether the Alist(O) is null). If the access list is not empty, in reference block 620, let Cj be the next child object (i.e. child object identifier) identified on the access list of parent object (i.e. object O).

In decision symbol 630, the reference probability of the child object Cj is compared with a hint threshold (i.e. TH), which is pre-specified threshold value (i.e. 0.75). In the preferred embodiment, the reference probability of Cj is defined to be the ratio of the second count to the first count (i.e. RCount(Cj)/TCount(O)). The ratio is an estimate of the probability that child object (object Cj) gets referenced after the parent object (object O) is referenced. If in decision symbol 630, the reference probability of Cj is larger than the hint threshold (i.e. TH), then the child object identifier (Cj) will be included in the PHI list in reference block 640. In other words, if the ratio exceeds the hint threshold, the child object identifier and associated information is placed on the prefetch hint information list.

The generating unit 266 may require software subroutines or software components to practice the comparison in reference block 630. In particular, the generating unit 266 for generating a prefetch hint information into a prefetch hint information list may include calculating means to calculate the reference probability and comparing means to compare the reference probability to the hint threshold.

In the preferred embodiment, using a PICS protocol, the PHI information is stored in the P-label, where the URL of child object (Cj) is taken as the identifier category (i.e. ID category value), its reference probability and size are taken as the probability category (i.e. PROB) and size category values, respectively. In decision symbol 645, if the access list of object O is not yet fully scanned, reference block 620 will be re-executed.

The statistics updating unit 252 is depicted in FIG. 5. Various alternative criterion can be used to select the prefetch candidates from the statistics table 261. For example, a moving average of the reference probability over past intervals can be used as the criterion. Furthermore, the selection procedure of the prefetch candidates can be made recursive. If a child object (object Cj) is selected as a prefetch candidate of parent object (object O), any child object (object Cji) on the access list of the child object (object Cj) is evaluated to determine whether to be included in the prefetch list of the parent object (object O), if not yet included. At decision symbol 630, the comparing unit or evaluating unit now tests whether the product of RCount (Cj)/TCount(O) and RCount(Cji)/TCount(Cj) is larger than the hint threshold (TH).

Figure 7:
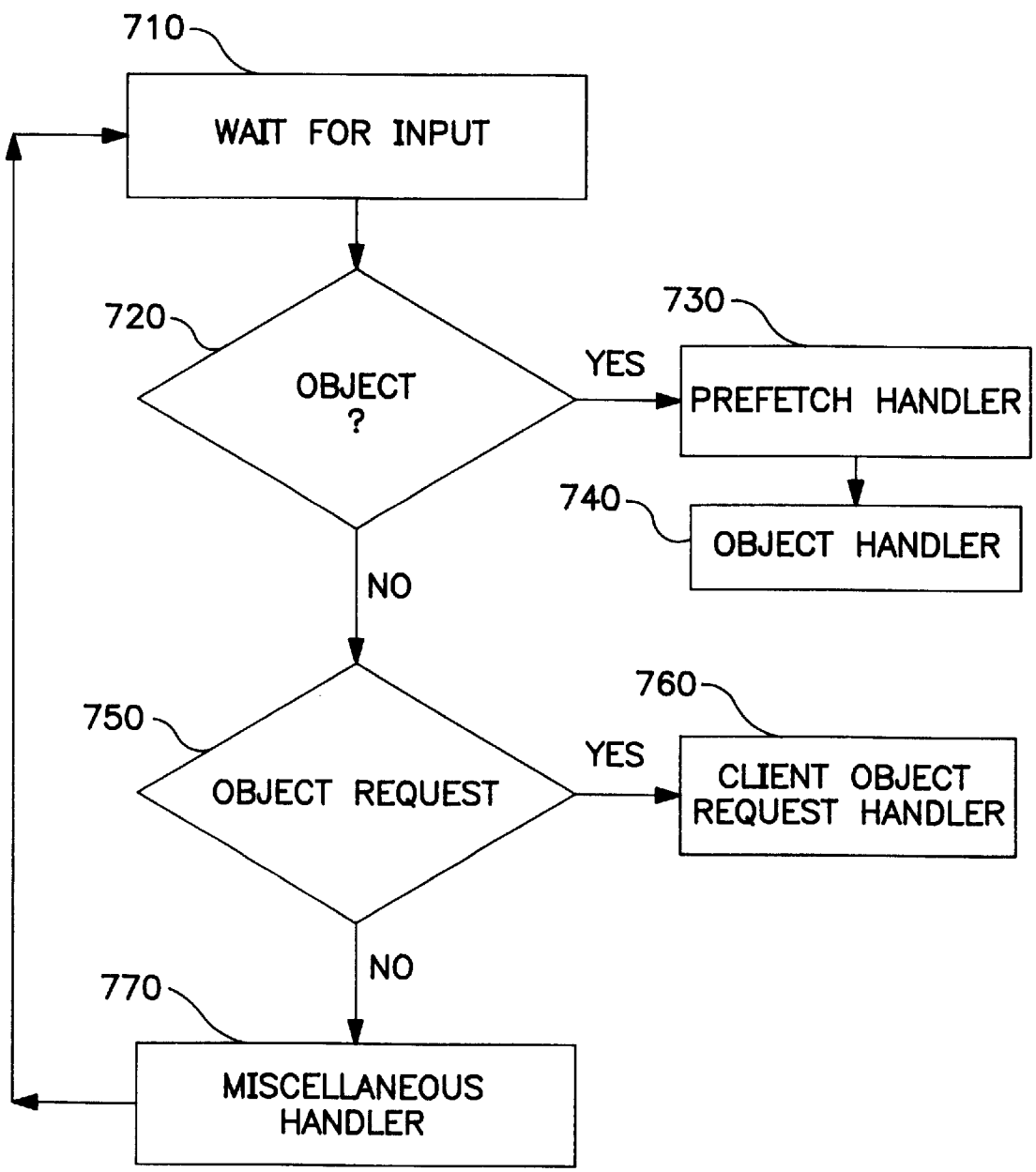
FIG. 7 is a flow chart diagram illustrating client operation in accordance with an exemplary embodiment of the present invention.

FIG. 7 depicts an example of a client logic 244. FIG. 7 shows that once a requested object is requested, the client object request handler 247 is invoked. Otherwise, the prefetch handler 248 may handle objects which are not requested, but need to be stored in the second prefetch cache 249 of the client 22.

Beginning in block 710, the client 22 waits for input. In decision symbol 720, if the input received is an object, the second prefetch handler 241 is invoked in reference block 730. In block 740, the client object handler is invoked to return the object to the requesting application at the client 22. If in decision symbol 750 the input received is an object request, the client object request handler 247 is invoked at reference block 760. For other types of inputs, which are not the focus of the present invention (such as a push request) an appropriate miscellaneous handler at reference block 770 can be invoked.

FIG. 8 depicts an example of the prefetching unit 250, including the first prefetch handler 248 or the second prefetch handler 241, or both the first prefetch handler 248 and the second prefetch handler 241. To summarize, the prefetching unit 250 uses the prefetch list generated by the generating unit 266 in FIG. 6 as an input to determine if child objects referenced on the prefetch hint information list warrant storing in one of the prefetch caches 298. The prefetching unit 250 calculates a prefetch value for each prefetch object candidate or child object identifier on the prefetch hint information list. The prefetch value considers access probability of the child object and access cost of storing the child object. The child objects with the highest threshold values are cached first until the available space in one of the prefetch caches 298 is filled.

Starting in reference block 805, let L be the PHI list of prefetch candidate objects. The prefetch candidate objects may be expressed in terms of child object identifiers on the prefetch hint information list. Any prefetch candidate appearing in the local cache (i.e. prefetch cache or main cache) is removed from L. In block 810, the prefetch value (PV) of each object in L is calculated. In the preferred embodiment, the PV value is defined to be the reference probability multiplied by the access cost. The access cost is estimated based on the closest site caching the prefetch candidate object or the child object identified on the PHI list. As a practical matter, the child objects preferably are identified on the PHI list by child object identifiers rather than as the entire child objects to conserve storage space. The reference probability optimally comes from the probability category (PROB category) value and the closest caching site comes from the caching category value of the PICS label. In block 820, the prefetch candidate object with the highest PV value is selected. In reference block 830, the amount of prefetch buffer space available to accommodate the prefetch object candidate (i.e. Oj) is determined. This space is either not currently in use or occupied by objects with lower PV values which are only a fraction (e.g. one half) of the PV value of the present prefetch object candidate being evaluated (i.e. Oj). Any storage space occupied by an object marked as deletable in one of the prefetch caches 298 is considered not currently in use. In decision symbol 840, one of the prefetch caches 298 is checked whether there is enough space for Oj. If so, in reference block 850, object Oj is prefetched, for example, into one of the prefetch caches 298. In block 860, Oj is removed from the PHI list (i.e. L). In reference block 870, if L is not empty, the step associated with reference block 820 is re-executed.

Although in the preferred embodiment each object is prefetched one at a time, multiple objects can be prefetched together in one request. In reference block 850, Oj can be put onto a prefetch list. In block 870, if L is empty, a prefetch request is then issued with the whole prefetch list. Furthermore, even if there is not enough storage space in the prefetch cache, a pending prefetch list can be maintained, so that when storage becomes available, additional prefetch can be initiated.

By using the HTTP protocol, the communication session can remain open during the prefetch to reduce communication overhead. There is no need to reestablish the session for each prefetch.

FIG. 9 depicts an example of the client object request handler 247. To summarize, the client object request handler 247 first searches the second main cache 246 and secondly searches the second prefetch cache 249. If the object is neither in the second main cache 246 or the second prefetch cache 249, an object request is sent to the server. If the object is in the second prefetch cache 249 a prefetched referenced message is sent to one of the servers to indicate the prefetch object was actually referenced. Then, the second prefetch handler 241 and the client object handler are used.

Starting at decision symbol 905, if the requested object O is found in the second main cache 246, the second prefetch handler 241 is invoked in reference block 925 to initiate appropriate prefetch operations based on the PHI associated with the object O. In reference block 930, the client object handler is invoked to return the requested object to the requesting application at the client. In decision symbol 910, if the requested object O is found in the second prefetch cache 249, a prefetch referenced message is sent to the content server 20 in block 920 so that its second statistics table 267 can be updated to capture the actual referencing of the prefetch object. In fact, as the prefetch referenced message propagates through the proxy hierarchy to the content server 20, the second statistics table 267 in each of the intermediate proxy will also get updated. In block 910, if the object is not in the second prefetch cache 249, an object request is send to the content server 20 through the proxy hierarchy in reference block 915.

The prefetch referenced message can be batched. That is, a prefetch referenced list can be maintained and periodically a prefetch referenced message is sent to the higher level server to acknowledge the referencing of all objects on the prefetch referenced list.

FIG. 10 depicts an example of a proxy server logic 295. In sum, the input is sorted in accordance with whether the input is an object request, an object transmission, or a prefetch referenced message. Three different handlers or software routines are available depending upon the input: a proxy object request handler 283, a proxy object handler 284, and a prefetched reference message handler.

Starting at reference block 1005, the proxy server 24 waits for input. If in decision symbol 1010 the input received is an object request for an object O, the proxy server 24 checks whether there is already a pending request on that object O in block 1015. The pending request may be due to a prefetch request on that object O issued by this proxy server 24 or an earlier request to the object O originated from another proxy server node, which is lower in the proxy server hierarchy. If there is no pending request on the object O in reference block 1015, the proxy object request handler 283 is invoked in block 1020. In decision symbol 1025, if the input received is an object (from the higher level proxy), the proxy object handler 284 is invoked in reference block 1030. Otherwise, in block 1040, if the input received is a prefetch referenced message, the prefetch referenced message handler 285 is invoked in block 1045. For other types of inputs, which are not the focus of the present invention (such as the an FTP request) an appropriate miscellaneous handler in block 1060 can be invoked.

FIG. 11 depicts an example of the proxy object request handler 283. To summarize, if objects are in the prefetch cache, the object is returned or sent to the requesting client or requesting proxy server. Thereafter, if the requested object was a prefetch request, the requested object is marked as deletable from the first prefetch cache 296 of the proxy server 24. If no prefetch request was provided for the requested object, a prefetch referenced message is sent to the content server 20. However, the prefetched reference message is only sent when the requested object is sent from the first prefetch cache 296. If a requested object is neither in the first prefetch cache 296 nor the first main cache 294, an object request is sent to another proxy server 24 or a content server 20. Requested objects found in the first main cache 294 are returned or sent to the requesting client or proxy server 24 and the first statistics table 293 or the statistics table 261 is updated if the request was not a prefetch request.

Beginning in decision symbol 1105, if the requested object O is found in the prefetch cache, the object O is returned to the requesting node in block 1130. In decision symbol 1135, if the request is a prefetch request, the object O in the first prefetch cache 296 is marked deletable in block 1150. Deleting objects from the first prefetch cache 296 makes room for future prefetch because the prefetch object O has now been prefetched by some nodes in the lower hierarchy of proxy servers 24. Otherwise, in reference block 1140, the cache manager is invoked to move the object O from the first prefetch cache 296 to the first main cache 294 since the object O has actually been referenced. In block 1160, a prefetch referenced message is sent to the content server 20 through the proxy hierarchy server. In block 1170, the update statistics routine is invoked to update the local first statistics table 293 to capture the actual referencing of the prefetch object O. In decision symbol 1110, if the object O is not found in the first main cache 294, an object request is send to the content server 20 through the proxy server hierarchy in reference block 1125. In decision symbol 1115, if the object request is not a prefetch request, the first update statistics routine 264 is invoked in block 1120 to update the local first statistics table 293 to capture the actual referencing of the object. In block 1180, the object O is returned to the requesting node.

FIG. 12 depicts an example of the prefetch referenced message handler 285. The prefetch referenced message handler 285 first looks at whether an object is in the first prefetch cache 296 or not. If the object is in the first prefetch cache 296, the cache manager routine is invoked prior to forwarding the prefetch referenced message. If the object is not in the first prefetch cache 296, the prefetch referenced message is forwarded.

Beginning at step 1205, the first update statistics routine 264 is invoked to update the local first statistics table 293 to capture the actual referencing of the prefetch object (O). In decision symbol 1210, if the object O is in the first prefetch cache 296, the cache manager is invoked in reference block 1215 to move the object O from the first prefetch cache 296 to the first main cache 294 since the object has actually been referenced. In block 1220, the prefetch referenced message is forwarded to the next higher level proxy.

FIG. 13 depicts an example of the proxy object handler 284. The proxy object handler 284 first invokes the prefetch updating unit 291 or a prefetch hint information update routine uniformly without exception. Prefetch object requests are handled differently depending upon whether the prefetch object was requested by a lower level server or not. If the prefetch object was requested by a lower level server, the object is returned to the lower level server. If the prefetch object was requested by a higher level server, the prefetch cache manager is invoked. If a prefetch object is not requested, the object is returned to the requesting proxy server 24 or client and the first update statistics routine 264 is invoked.

Beginning at reference block 1305, the PHI update routine or the prefetch updating means 291 is invoked to update the PHI of object O. In reference block 1310, if the object received is not a prefetch object, the first prefetch handler 248 is invoked in step 1315. In reference block 1320, the object is returned to the requesting node (in the lower hierarchy). Under the preferred embodiment using the PICS protocol, the caching category value in the P-label is be updated if the corresponding prefetch candidate (indicated by the identifier category value) is prefetched by this proxy server 24. In block 1325, the cache manager is invoked to store the object in the main cache. In reference block 1355, the update statistics routine is invoked. In block 1330, if the prefetch object received is requested by a lower level node in the hierarchy, the object is returned to the requester in reference block 1350. Otherwise, it is requested by the current node, and the prefetch cache manager is invoked in reference block 1340 to store the object in the prefetch cache by making necessary replacement to make room for the object.

FIG. 14 depicts an example of the prefetch updating means 291 or the PHI update routine. The PHI update routine compares a local count of requested objects to a threshold count. If the requested objects exceed a first minimum threshold, they are subjected to a second minimum threshold test. The thresholds may be set based upon experimental results. If the local count is less than the first minimum threshold, the original prefetch hint information list is kept. If the local count is greater than the first threshold, but not greater than the second threshold, the prefetch hint information list is modified.

Beginning in decision symbol 1405, if the local count (i.e. TCount) of the object (O) in the local first statistics table 293 is not larger than a first minimum threshold (i.e. CTM), the original PHI in the header of the object O is kept. This is simply due to the fact that there is not enough referencing to the object in the lower hierarchy of proxy servers 24 to warrant any updating action. In decision symbol 1415, if the local count (i.e. TCount) of the object (O) in the local statistics table 261 is larger than a second minimum threshold (i.e. TCH), the original PHI in the object header is ignored and the PHI generation routine is invoked in block 1420 to generate the PHI based on the local first statistics table 293. This is because there is sufficient references to the object lower in the hierarchy of proxy servers 24 to generate the PHI based on the local behavior. Otherwise, the PHI modifier is invoked in reference block 1425 to modify the probability category value by taking an average of the local estimate of the reference probability and that in the header (set by the higher level hierarchy) for each object in the PHI list.

The prefetch scheme works even if some of the proxy servers 24 do not maintain the first statistics table 293 and track local reference patterns. The non-tracking proxy servers simply accept the probability (i.e. PROB) category value in the PHI passed down from the higher level proxy server or content server 20.

The prefetch scheme also works in a heterogeneous proxy-server environment, where some of the proxy servers are conventional proxy servers which do not understand the prefetch protocol and do not participate in the collaboration. These conventional proxy servers will neither interpret the object header to initiate the prefetch operations, nor maintain the first statistics table 293. The conventional proxy servers will only pass the meta data (e.g. the PICS labels in the header) with the object to the next level proxy server or store the meta data with the object if it decides to cache the object locally.

Even without the presence of the proxy hierarchy, the current invention can be applied to any network or client server environment. The object sender node can track reference patterns, derive PHI and include it in the object header. Furthermore, the object receiver node can store the PHI with the object in its cache. Upon referencing of the object, prefetch operations can be initiated based on the stored PHI and local factors such as cache size and access cost as discussed before.

Storing the PHI with the cached object provides additional opportunity for prefetching. Events such as more storage becoming available, additional references occurring or prefetch objects being received, can be used to trigger additional prefetch by examining the PHI of the cached objects. The prefetch operation is not restricted to the moment that an object is requested from the server as in the sender initiated approach.

In the preferred embodiment of the present invention, a general prefetch policy for web and proxy servers has been described. Those skilled in the art will appreciate, however, that the present invention is applicable to any kind of situation where the objects to be prefetched have similar characteristics, and is not necessarily restricted to an Internet or WWW application.

While the preferred embodiment of the present invention is for collaborative prefetching between parent and child proxies in the hierarchy, it can be easily adapted to include collaboration between sibling proxies. For example if no proxy in the upper hierarchy has cached the requested object or prefetch candidate, a proxy can also interrogate sibling proxies.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. A processing system for enhancing a flow of data from servers to clients along a network, the processing system comprising:

proxy servers associated with the network;

a content server associated with the network;

clients configured for communicating with one or more of said proxy servers;

a statistics table being stored in at least one of said proxy servers, the statistics table storing parent object identifiers and associated child object identifiers, the statistics table containing first counts of parent objects, the first counts representing the frequency in which parent objects are referenced by the clients, the statistics table containing second counts of child objects, the second counts representing the frequency in which the corresponding child objects are referenced after select ones of said parent objects are referenced; and generating means for generating a prefetch hint information list by accepting inputs of the first counts and the corresponding second counts to derive the prefetch hint information list, said generating means including:

calculating means for calculating a ratio of the second count to the first count for each of said parent object identifiers;

comparing means for comparing the ratio to a hint threshold, the comparing means grouping or associating child objects and associated parent objects on the prefetch hint information list if the ratio exceeded the hint threshold; and prefetching means for prefetching child objects based on the prefetch hint information and parent objects actually requested by the clients, the prefetching means comprises a first prefetch handler being stored in at least one of said proxy servers; the prefetching means including computing means for computing a prefetch value, and evaluating means for evaluating the prefetch value computed by the computing means; said computing means computing a prefetch value for each child object identifier on the prefetch hint information list; said evaluating means evaluating the prefetch values of multiple child objects and prioritizing the caching of child objects associated with the highest prefetch values on the prefetch hint information list, the first prefetch handler managing available space in a prefetch cache associated with one of said proxy servers.

2. The processing system of claim 1 wherein one of said proxy servers has a prefetch cache, and wherein the prefetching means prefetches child objects and stores the child objects in the prefetch cache based on a priority scheme, the priority scheme storing objects with a highest prefetch value first until available memory of the prefetch cache is filled, the prefetch value based upon an individual or aggregate reference probability to the child objects by one or more clients.

3. The processing system according to claim 1 wherein each of said proxy servers has a first processor, a first memory, and a first storage means for storing data; the first memory having at least a logical separation between a first main cache and a first prefetch cache;

the content server having a second processor, a second memory, and a second storage means for storing data;

at least one of the clients having a third processor, a third memory, and a third storage means for storing data, the third memory having at least a logical separation between a second main cache and a second prefetch cache, the prefetch handling means storing child objects in the first prefetch cache or the second prefetch cache.

4. The processing system according to claim 1 further comprising:

statistics updating means for updating the statistics table based upon a child object actually requested; the statistics updating means first searching for an identity of a referring one of said parent objects, the referring one, or referrer object, being referenced prior to the child object actually requested, the child object actually requested having its corresponding second count updated in the statistics table.

5. A processing system for enhancing a flow of data from servers to clients along a network, the processing system comprising:

proxy servers associated with the network;

a content server associated with the network;

clients configured for communicating with one or more of said proxy servers;

a statistics table being stored in at least one of said proxy servers, the statistics table storing parent object identifiers and associated child object identifiers, the statistics table containing first counts of parent objects, the first counts representing the frequency in which parent objects are referenced by the clients, the statistics table containing second counts of child objects, the second counts representing the frequency in which the corresponding child objects are referenced after select ones of said parent objects are referenced; and generating means for generating a prefetch hint information list by accepting inputs of the first counts and the corresponding second counts to derive the prefetch hint information list, said generating means including:

calculating means for calculating a ratio of the second count to the first count for each of said parent object identifiers;

comparing means for comparing the ratio to a hint threshold, the comparing means grouping or associating child objects and associated parent objects on the prefetch hint information list if the ratio exceeded the hint threshold; and prefetching means for prefetching child objects based on the prefetch hint information and parent objects actually requested by the clients, the prefetching means comprises a first prefetch handler being stored in at least one of said proxy serves and a second prefetch handler being stored in at least one of said clients, respectively; the prefetching means including computing means for computing a prefetch value, and evaluating means for evaluating the prefetch value computed by the computing means; said computing means computing a prefetch value for each child object identifier on the prefetch hint information list and prioritizing the caching of child objects with the highest prefetch values on the prefetch hint information list, the prefetch handling means managing available space in the prefetch cache.

6. The processing system of claim 5 wherein one of said proxy servers has a prefetch cache, and wherein the prefetching means prefetches child objects and stores the child objects in the prefetch cache based on a priority scheme, the priority scheme storing objects with a highest prefetch value first until available memory of the prefetch cache is filled, the prefetch value based upon an individual or aggregate reference probability to the child objects by one or more clients.

7. The processing system according to claim 5 wherein each of said proxy servers has a first processor, a first memory, and a first storage means for storing data; the first memory having at least a logical separation between a first main cache and a first prefetch cache;

the content server having a second processor, a second memory, and a second storage means for storing data;

at least one of the clients having a third processor, a third memory, and a third storage means for storing data, the third memory having at least a logical separation between a second main cache and a second prefetch cache, the prefetch handling means storing child objects in the first prefetch cache or the second prefetch cache.

8. The processing system according to claim 5 further comprising:

statistics updating means for updating the statistics table based upon a child object actually requested; the statistics updating means first searching for an identity of a referring one of said parent objects, the referring one, or referrer object, being referenced prior to the child object actually requested, the child object actually requested having its corresponding second count updated in the statistics table.

9. A processing system for enhancing a flow of data from servers to clients along a network, the processing system comprising:

proxy servers associated with the network;

a content server associated with the network;

clients configured for communicating with one or more of said proxy servers;

a statistics table being stored in at least one of said proxy servers, the statistics table storing parent object identifiers and associated child object identifiers, the statistics table containing first counts of parent objects, the first counts representing the frequency in which parent objects are referenced by the clients, the statistics table containing second counts of child objects, the second counts representing the frequency in which the corresponding child objects are referenced after select ones of said parent objects are referenced; and generating means for generating a prefetch hint information list by accepting inputs of the first counts and the corresponding second counts to derive the prefetch hint information list, said generating means including:

calculating means for calculating a ratio of the second count to the first count for each of said parent object identifiers;

comparing means for comparing the ratio to a hint threshold, the comparing means grouping or associating child objects and associated parent objects on the prefetch hint information list if the ratio exceeded the hint threshold; and prefetching means for prefetching child objects based on the prefetch hint information and parent objects actually requested by the clients, and prefetch updating means for updating the prefetch hint information list; the prefetch updating means comparing the first counts to first local threshold counts and second local threshold counts, the first local threshold counts based on statistics from one server, the second local threshold counts based on statistics from another server, said prefetch updating means invoking the generating means for each of the child object identifiers for which the first counts exceeds both the first local threshold counts and the second local threshold counts; the prefetch updating means keeping the original prefetch hint information list if the first counts do not exceed the first local threshold counts.

10. The processing system of claim 9 further comprising:

statistics updating means for updating the statistics table;

a proxy object handler being stored in one of said proxy servers, the proxy object handler invoking a prefetch hint information list update routine, the proxy object handler returning a requested object to a lower level proxy server if the lower level proxy server requested the requested object, the proxy object hander returning the requested object and invoking the statistics updating means if the requested object is not a prefetch object;

a prefetch cache manager for managing a prefetch cache associated with one of said proxy servers, the proxy object handler invoking the prefetch cache manager if the lower level server did not request the requested object;

a proxy object request handler being stored one of said proxy servers, the proxy object request handler retuning objects to a requesting one of said clients and marking the object as deletable from the prefetch cache if objects are in the prefetch cache and if the object was requested pursuant to a prefetch request; the proxy object request handler sending an object request to another server if the requested object is not in a main cache or the prefetch cache, the proxy object request handler communicating with the statistics updating means if the requested object is not associated with the prefetch request and if the requested object is located in the prefetch cache or the main cache.

11. The processing system according to claim 9 further comprising:

statistics updating means for updating the statistics table;

a prefetch referenced message handler being stored in one of said proxy servers, the prefetch referenced message handler invoking the statistics updating means, the prefetch referenced message handler forwards a prefetch referenced message after invoking a cache manager routine if a requested object is located in the prefetch cache.

12. The processing system of claim 9 wherein one of said proxy servers has a prefetch cache, and wherein the prefetching means prefetches child objects and stores the child objects in the prefetch cache based on a priority scheme, the priority scheme storing objects with a highest prefetch value first until available memory of the prefetch cache is filled, the prefetch value based upon an individual or aggregate reference probability to the child objects by one or more clients.

13. The processing system according to claim 9 wherein each of said proxy servers has a first processor, a first memory, and a first storage means for storing data; the first memory having at least a logical separation between a first main cache and a first prefetch cache;

the content server having a second processor, a second memory, and a second storage means for storing data;

at least one of the clients having a third processor, a third memory, and a third storage means for storing data, the third memory having at least a logical separation between a second main cache and a second prefetch cache, the prefetch handling means storing child objects in the first prefetch cache or the second prefetch cache.

14. The processing system according to claim 9 further comprising:

statistics updating means for updating the statistics table based upon a child object actually requested; the statistics updating means first searching for an identity of a referring one of said parent objects, the referring one, or referrer object, being referenced prior to the child object actually requested, the child object actually requested having its corresponding second count updated in the statistics table.

15. A processing system for enhancing a flow of data from servers to clients along a network, the processing system comprising:

proxy servers associated with the network;

a content server associated with the network;

clients configured for communicating with one or more of said proxy servers in order to request one object from another object, the one and another object coupled together by one of a plurality of logical links prior to providing said request;

a statistics table being stored in the content server and at least one of said proxy servers, the statistics table storing parent object identifiers and associated child object identifiers, the statistics table containing first counts of parent objects, the first counts representing the frequency in which parent objects are requested by one of said logical links by the clients, the statistics table containing second counts of child objects, the second counts representing the frequency in which the corresponding child objects are proximately, temporally referenced after select ones of said parent objects are referenced;

generating means accepting inputs of first counts, second counts, child object identifiers, and parent object identifiers from the statistics table, the generating means including evaluating means for evaluating the access relationship between parent objects and their associated child objects, the evaluating means placing child object identifiers on a prefetch hint information list if the child objects are referenced with adequate frequencies proximately and subsequently prior to references by the clients to corresponding parent objects, said generating means including:

calculating means for calculating ratios of the second counts to the first counts for each of said parent object identifiers, and comparing means for individually comparing the ratios to a hint threshold, the comparing means grouping or associating child objects and associated parent objects on the prefetch hint information list for parent objects that exceed the hint threshold; and prefetching means for prefetching child objects via one of said logical links based on the prefetch hint information and parent objects actually requested by the clients.

16. The system according to claim 15 wherein the generating means further comprises calculating means for calculating the adequate frequencies based on the ratio of child accesses to corresponding parent accesses.

17. The system according to claim 15 wherein the prefetching means further comprises assigning means for assigning storage priorities to child objects identified on the prefetch hint information list and selective storage means for storing select ones of the child objects in accordance with the storage priorities.

18. The system according to claim 15 wherein the assigning means assigns storage priorities based on an estimated access probability that a child object on the prefetch hint information list will be accessed by particular ones of the clients and an access cost of the child object based on requisite storage size for storing select ones of the child objects.

* * * * *